United States Patent
Kihara et al.

(10) Patent No.: US 8,337,802 B2
(45) Date of Patent: Dec. 25, 2012

(54) METHOD FOR CONCENTRATING OXYGEN ISOTOPE OR ISOTOPES

(75) Inventors: Hitoshi Kihara, Chiba (JP); Shigeru Hayashida, Kofu (JP); Takashi Kambe, Tsuchiura (JP); Hiroshi Kawakami, Tsuchiura (JP); Shigeyoshi Arai, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 11/989,431

(22) PCT Filed: Aug. 16, 2006

(86) PCT No.: PCT/JP2006/316079
§ 371 (c)(1),
(2), (4) Date: Feb. 11, 2008

(87) PCT Pub. No.: WO2007/020934
PCT Pub. Date: Feb. 22, 2007

(65) Prior Publication Data
US 2009/0035212 A1     Feb. 5, 2009

(30) Foreign Application Priority Data
Aug. 17, 2005  (JP) ............... P2005-236499

(51) Int. Cl.
*B01D 59/34*   (2006.01)
*B01D 59/00*   (2006.01)

(52) U.S. Cl. ..................... 423/579; 423/580.2
(58) Field of Classification Search ............ 423/DIG. 7, 423/579, 580.2; *B01D 59/00*
See application file for complete search history.

(56) References Cited

U.S. PATENT DOCUMENTS

| | | | |
|---|---|---|---|
| 4,029,558 A | 6/1977 | Marling | |
| 4,029,559 A | 6/1977 | Marling | |
| 6,461,583 B1 * | 10/2002 | Hayashida et al. | 423/579 |
| 2005/0129592 A1 * | 6/2005 | Kihara et al. | 422/187 |
| 2006/0249366 A1 | 11/2006 | Hayashida | |

FOREIGN PATENT DOCUMENTS

EP         1 604 729      12/2005
(Continued)

OTHER PUBLICATIONS

International Search Report for PCT/JP2006/316079 mailed Oct. 3, 2006.

(Continued)

*Primary Examiner* — Stuart Hendrickson
*Assistant Examiner* — Alexander Polyansky
(74) *Attorney, Agent, or Firm* — Nixon & Vanderhye P.C.

(57) ABSTRACT

The method for concentrating an oxygen isotope or isotopes of the present invention combines the step of concentrating $^{17}O$ and/or the step of depleting $^{18}O$ that utilizes photodissociation of ozone by a laser beam with an oxygen distillation step that concentrates the oxygen isotope. At this time, it is preferable to carry out a step of isotope scrambling in addition to the above. When both a step of concentrating $^{17}O$ and a step of depleting $^{18}O$ are carried out, whichever thereof may be done first prior to the other. Also these steps may be placed either before or after the oxygen distillation step. Moreover, at least one of said oxygen distillation step, the concentrating $^{17}O$ step, the depleting $^{18}O$ step and the isotope scrambling step is preferably carried out twice or more.

9 Claims, 14 Drawing Sheets

FOREIGN PATENT DOCUMENTS

| | | |
|---|---|---|
| JP | 2004/261776 | 9/2004 |
| JP | 2005/40668 | 2/2005 |
| WO | 00/27509 | 5/2000 |
| WO | 2004/078325 | 9/2004 |

OTHER PUBLICATIONS

Dostrovsky et al., "The production of stable isotopes of oxygen", *Analytical Chemistry Symposium Series*, 1982, pp. 693-702.

J. Marling, "Isotope separation of oxygen-17, oxygen-18, carbon-13 and deuterium by ion laser induced formaldehyde photopredissociation", *The Journal of Chemical Physics*, vol. 66, No. 9, 1977, pp. 4200-4225.

Wen et al., "Experimental and theoretical study of isotope effects on ozone decomposition", *J. Geophysical Research*, vol. 96, No. D6, 1991, pp. 10911-10921.

McInteer et al., "Nitric oxide distillation plant for isotope separation", *Ind. Eng. Chem.*, Process Design Development, vol. 4, No. 1, 1965, pp. 35-42.

\* cited by examiner

METHOD FOR CONCENTRATING OXYGEN ISOTOPE OR ISOTOPES

This application is the U.S. national phase of International Application No. PCT/JP2006/316079 filed 16 Aug. 2006 which designated the U.S. and claims priority to Japanese Application No. 2005-236499 filed 17 Aug. 2005, the entire contents of each of which are hereby incorporated by reference.

TECHNICAL FIELD

The present invention relates to a method for concentrating an oxygen isotope or isotopes. More particularly, the present invention relates to a method for efficiently concentrating a stable oxygen isotope $^{17}O$ that has extremely low abundance to a high concentration by combining laser isotope separation utilizing photodissociation of ozone by a laser beam and separation by distillation, and to a method for efficiently concentrating $^{17}O$ and $^{18}O$ simultaneously.

BACKGROUND ART

Among the stable oxygen isotopes $16O$, $^{17}O$ and $^{18}O$, $^{17}O$ is the only one that has nuclear spin. For this reason, compounds labeled with $^{17}O$ have been used for research purposes such as structural analysis by means of nuclear magnetic resonance, and used as a tracer in such fields as chemistry and medicine. They are also considered useful in medicine as the material to manufacture the diagnostic agent $^{18}FDG$ (PET contrast medium made by labeling fluorodeoxyglucose with a fluorine 18 radioactive isotope having a positron-emitting nuclide) used in positron emission tomography diagnosis (PET) of tumors and other anomalies.

While $^{17}O$ and $^{18}O$ are useful isotopes for industrial purposes, they exist in extremely low abundance in nature. Therefore, in order to use the isotope in practical application, $^{17}O$ and/or $^{18}O$ must be concentrated from compounds that include oxygen atoms.

As the conventional method for concentrating $^{17}O$, for example, the following conventional methods have been known.

There is a method of distilling water as the starting material so as to concentrate $^{17}O$ up to 25 atom %, and then concentrating it to 90 atom % by thermal diffusion (Non-Patent Document 1). Another method uses nitrogen monoxide (NO) as the starting material and distils it to concentrate $^{17}O$, and then uses thermal diffusion to concentrate $^{17}O$ to a high concentration (for example, 40 atom %) (Non-Patent Document 4). Another method uses oxygen as the starting material and distils it to concentrate $^{17}O$ to 10 atom % (Patent Document 1). Another method employs photopredissociation of formaldehyde by means of irradiation with a Ne ion laser so as to concentrate $^{17}O$ (Non-Patent Document 2, Patent Documents 5 and 6). There are also such methods as ozone is irradiated with visible light and ultraviolet rays (Non-Patent Document 3) and a semiconductor laser is used to separate ozone molecules that include $^{17}O$ by photodissociation, thereby to enrich $^{17}O$ in oxygen (Non-Patent Documents 2, 3 and 4).

[Patent Document 1] International Publication No. WO00/27509
[Patent Document 2] Japanese Unexamined Patent Application, First Publication No. 2004-261776
[Patent Document 3] Japanese Unexamined Patent Application, First Publication No. 2005-040668
[Patent Document 4] International Publication No. WO2004/078325
[Patent Document 5] U.S. Pat. No. 4,029,559
[Patent Document 6] U.S. Pat. No. 4,029,558
[Non-Patent Document 1] I. Dostrovsky: "The production of stable isotope of oxygen", Analytical Chemistry Symposium Series pp. 693-702 (1982)
[Non-Patent Document 2] Jack Marling: "Isotope separation of oxygen-17, oxygen-18, carbon-13 and deuterium by ion laser induced formaldehyde photopredissociation", The Journal of Chemical Physics, Vol. 66, No. 9, pp. 4200-4225 (1977)
[Non-Patent Document 3] J. Wen and Mark H. Thiemens: "Experimental and theoretical study of isotope effects on ozone decomposition", J. Geophysical Research, Vol. 96, No. D6, pp. 10911-10921 (1991)
[Non-Patent Document 4] McInteer, B. B.; Potter, Robert M.: "Nitric oxide distillation plant for isotope separation", Ind. Eng. Chem., Process Design Develop., 4(1), 35-42 (1965)

DISCLOSURE OF INVENTION

The method described in Non-Patent Document 1 has such a problem that there is an upper limit of several atomic percentage points on the practically achievable concentration of $^{17}O$ when yield is taken into consideration. The method described in Non-Patent Document 4 has such a problem that $^{17}O$-enriched $H_2O$ and $O_2$, that are manufactured by this method of concentration and are commercially available, have insufficient levels of concentration.

The methods described in Non-Patent Document 2 and Patent Documents 5 and 6 also provide insufficient levels of concentration and have not developed enough to establish technologies that can be implemented on an industrial scale.

According to the method described in Non-Patent Document 3, although $^{17}O$ and $^{18}O$ are concentrated in residual ozone and the isotope effect of ozone decomposition can be confirmed, such a level of concentration that can be utilized in the separation of an isotope cannot be achieved. Also, technologies that can be implemented on an industrial scale have not been established.

The methods described in Patent Documents 2, 3 and 4, on the other hand, are promising in view of industrial application. With these methods, however, the absorption wavelength regions, in which various ozone molecules with different oxygen isotopes absorb a laser beam, overlap each other. Therefore, an attempt to selectively dissociate only the ozone molecules that include $^{17}O$ by means of a laser beam inadvertently causes the ozone isotope molecules such as $^{16}O_3$ having higher abundance to dissociate at the same time, particularly in the case where the abundances of ozone molecules that include $^{17}O$ are lower. Thus, it is difficult to efficiently concentrate $^{17}O$.

The method described in Patent Document 1 will be described in more detail below in relation to the present invention.

All isotope molecules that include either $^{16}O$, $^{17}O$ or $^{18}O$ have vapor pressures (boiling points) that are very approximate to each other. An isotope molecule that includes $^{17}O$ is an intermediate component between an isotope molecule that includes $^{16}O$ and an isotope molecule that includes $^{18}O$ (an isotope molecule that includes $^{17}O$ has a vapor pressure or a boiling point of an intermediate value between those of an isotope molecule that includes $^{16}O$ and an isotope molecule that includes $^{18}O$). Natural abundance of $^{17}O$ is about 370 atomppm, lower than that of $^{18}O$ that is 2000 atomppm. As a result, it is difficult to efficiently achieve a high concentration (for example, 5 atom % or higher) of $^{17}O$ by the method of concentrating $^{17}O$ by distillation as disclosed in Patent Document 1. This problem will be described below in more detail by way of example.

FIG. 22 is a schematic diagram of a distillation column 1 used to increase the concentration of isotope $^{17}O$ or $^{18}O$ by distilling a compound that includes an oxygen atom and/or atoms (for example, $H_2O$, NO, $O_2$, etc.). In practice, it is common to carry out a series of distillation operations by using an apparatus including a plurality of distillation columns connected in cascade, since the height (theoretical plates) of the distillation column is often required to be very large. However, the step will be described here using a constitution of a single distillation column for the purpose of clarity.

A starting material F (for example, $H_2O$, NO, $O_2$, etc.) that includes oxygen isotopes of natural abundance shown in Table 1 is fed to the distillation column 1 at an intermediate point near the top-thereof, and a product P1 enriched in $^{17}O$ or $^{18}O$ is drawn from the bottom of the column. In addition to the product P1, another product P2 enriched in $^{17}O$ or $^{18}O$ may also be drawn from an intermediate position of the column located near the bottom than the point of feeding the starting material F. Waste gas W depleted in $^{17}O$ or $^{18}O$ in comparison to the starting material F is discharged from the top.

TABLE 1

| Isotope | Atomic mass | Abundance |
| --- | --- | --- |
| $^{16}O$ | 16 | 0.99759 |
| $^{17}O$ | 17 | 0.00037 |
| $^{18}O$ | 18 | 0.00204 |

In the case where $^{17}O$ is concentrated at the bottom of the distillation column 1 and the product P1 is drawn from the bottom, concentrations of different isotopes are distributed in the distillation column roughly as shown in FIG. 23. Concentrations (atom %) of the oxygen isotopes are plotted along the vertical axis and the height in the distillation column is plotted along the horizontal axis. The same applies to the other graphs of concentration. The concentration of $^{17}O$ in the product P1 is roughly in a range from 0.2 to 5 atom %, although it depends on the height (theoretical plates) of the distillation column. In the case shown in FIG. 23, the concentration of $^{17}O$ in the product P1 is about 1 atom %.

In order to achieve a high concentration (for example, 5 atom % or higher) of $^{17}O$, a larger height (more theoretical plates) of the distillation column is required. In a distillation column having a larger height, as illustrated in FIG. 24, $^{18}O$ that has a higher boiling point than $^{17}O$ is concentrated to a high concentration near the bottom, so that $^{17}O$ has such a concentration distribution that is low near the bottom and has a peak in the intermediate portion of the column. That is, the inner space of the distillation column 1 may be divided into a section A ranging from the starting material F feeding position to the $^{17}O$-enriched product P2 drawing position in which the concentration of $^{17}O$ is high, and a section B ranging from the $^{17}O$-enriched product P2 drawing position to the $^{18}O$-enriched product P1 drawing position in which the concentration of $^{18}O$ is high. In order to obtain a high concentration (for example, 5 atom % or higher) of $^{18}O$ at the $^{17}O$-enriched product P2 drawing position, the section A and section B must have very large vertical length which makes this method of concentration industrially impractical.

Moreover, the distillation step requires hold-up of a large quantity of liquid within the apparatus due to the principle of operation. As a result, a period as long as several years is required in startup of the apparatus in order to concentrate $^{17}O$, of which natural abundance is about 370 ppm at the most, to a high concentration (for example, 5 atom % or higher).

For the reasons described above, it may well be said that concentration of $^{17}O$ to a high concentration (for example, 8 atom % or higher) merely by distillation is impractical as an industrial step.

DISCLOSURE OF THE INVENTION

An object of the present invention is to provide a method for concentrating $^{17}O$ which is capable of concentrating $^{17}O$, which is a stable isotope of oxygen having an extremely low abundance, to a high concentration efficiently on an industrially viable scale. Another object of the present invention is to provide a method for concentrating $^{17}O$ to a high concentration while concentrating $^{18}O$ at the same time.

To solve the object described above, a first aspect of the present invention provides a method for concentrating an oxygen isotope including concentrating the oxygen isotope through distillation of oxygen; and concentrating oxygen isotope $^{17}O$ through photodissociation of ozone.

The method for concentrating an oxygen isotope or isotopes of the present invention preferably includes carrying out isotope scrambling.

The method for concentrating an oxygen isotope or isotopes of the present invention preferably also includes depleting oxygen isotope $^{18}O$ through photodissociation of ozone.

In the method for concentrating an oxygen isotope or isotopes of the present invention, at least one step of concentrating the oxygen isotope through distillation of oxygen; concentrating oxygen isotope $^{17}O$ through photodissociation of ozone; depleting oxygen isotope $^{18}O$ through photodissociation of ozone; and carrying out isotope scrambling, is preferably carried out twice or more.

In the method for concentrating an oxygen isotope or isotopes of the present invention, either the step of depleting oxygen isotope $^{18}O$ may be carried out first followed by the step of concentrating oxygen isotope $^{17}O$, or the step of concentrating oxygen isotope $^{17}O$ may be carried out first followed by the step of depleting oxygen isotope $^{18}O$.

A second aspect of the present invention provides a method of manufacturing heavy oxygen water, including: adding hydrogen to $^{17}O$-enriched oxygen and/or $^{18}O$-enriched oxygen obtained by the method for concentrating an oxygen isotope or isotopes according to any one of claims 1 to 9 so as to obtain water in which the oxygen isotope $^{17}O$ and/or oxygen isotope $^{18}O$ are concentrated to a 1 atom % or higher concentration.

A method for concentrating an oxygen isotope or isotopes of the present invention enables $^{17}O$ of high concentration to be obtained sufficiently. Since this method enables carrying out concentration with a shorter startup time than in the prior art, $^{17}O$ of high concentration can be obtained in an industrial scale at a low cost. During the concentration, conversion of ozone to oxygen or conversion of oxygen to ozone can be easily carried out, and therefore, $^{17}O$ can be concentrated by combining various steps, so that a proper step can be selected in accordance to the desired concentration of $^{17}O$ and the planned production output. When the starting material is processed to obtain $^{17}O$ of high concentration, $^{17}O$ of high concentration is separated and recovered from the oxygen in the starting material in the step of concentrating oxygen isotope $^{17}$O and the step of depleting oxygen isotope $^{18}$O. As a result, $^{18}$O of high concentration as well as $^{17}$O of high concentration can be obtained.

Moreover, heavy oxygen water enriched in $^{17}$O or $^{18}$O can be obtained at a low cost on an industrial scale, by using $^{17}$O-enriched oxygen or $^{18}$O-enriched oxygen obtained by the method for concentrating an oxygen isotope or isotopes of the present invention.

Figure 1:
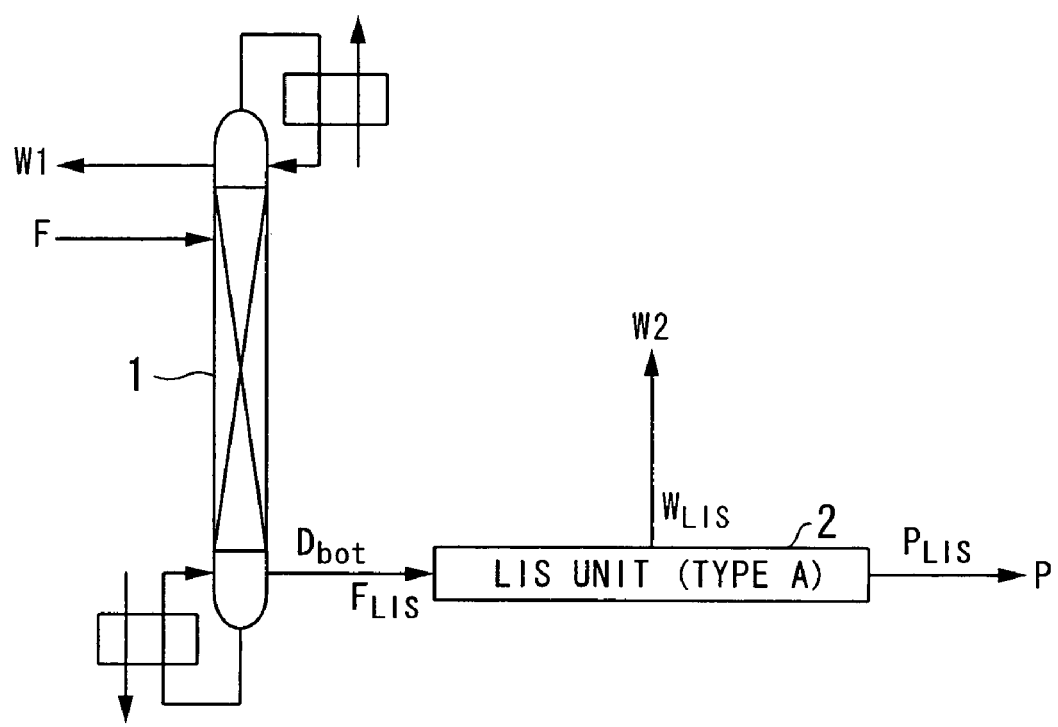
FIG. 1 is a schematic diagram showing a first embodiment of the present invention.

The reference numerals shown in these figures as defined as follows:

1 and 6 represent a distillation column, 2 represents an ozone separation apparatus (Type A), 3 represents an isotope scrambler, and 4 and 5 represent an ozone separation apparatus (Type B).

BEST MODE FOR CARRYING OUT THE INVENTION

Now the present invention will be described in detail below.

The present invention provides a method of concentrating $^{17}$O to a high concentration (for example, 5 atom % or higher) by a step designed to make the best use of the effects of concentrating $^{17}$O of a $^{17}$O concentrating method based on a distillation apparatus and of a $^{17}$O concentrating method based on a laser isotope separation apparatus (hereinafter referred to simply as laser separation apparatus) that utilizes the photodissociation reaction of ozone.

According to the method, $^{17}$O is concentrated by distillation in a low concentration zone (for example, from 370 atomppm to 0.2 atom %), and the preliminarily concentrated $^{17}$O obtained by the distillation is further concentrated by laser separation to obtain $^{17}$O of high concentration (for example, 5 atom % or higher).

The present invention also provides a method for promoting the concentration of $^{17}$O in the distillation column by using the laser separation apparatus connected to the distillation column to effectively remove $^{18}$O that impedes the concentration of $^{17}$O by distillation. The present invention also provides a method for achieving an ultra-high concentration, for example 70% or higher, of $^{17}$O by combining the above-mentioned methods.

Concentration of $^{17}$O by means of the laser separation apparatus can be carried out by the following two methods.

One is to selectively decompose ozone molecules that include $^{17}$O, among ozone molecules including $^{16}$O, $^{17}$O and $^{18}$O, in ozone gas and separate the resultant $^{17}$O-enriched oxygen from the ozone gas, thereby to concentrate $^{17}$O. Another method is to remove $^{18}$O-enriched oxygen, which is obtained by selectively decomposing ozone molecules that include $^{18}$O, from the ozone gas that includes the various isotopes thereby to deplete $^{18}$O.

According to the present invention, concentration of $^{17}$O is carried out efficiently by combining the step of concentrating $^{17}$O and/or the step of depleting $^{18}$O with the oxygen distillation step. Efficiency of $^{17}$O concentration can be further improved by adding a step of isotope scrambling to the method described above.

When both the step of concentrating $^{17}$O and the step of depleting $^{18}$O are carried out, whichever thereof may be done first prior to the other. Also these steps may be placed either before or after the oxygen distillation step.

Moreover, efficiency of $^{17}$O concentration can be further improved by running at least one of the oxygen distillation step, the step of concentrating oxygen isotope $^{17}$O, the step of depleting oxygen isotope $^{18}$O and the step of carrying out isotope scrambling, twice or more.

When highly concentrated $^{17}$O is to be obtained from the starting material of oxygen, highly concentrated $^{18}$O is separated and recovered from the starting material of oxygen in the step of concentrating $^{17}O$ and the step of depleting $^{18}O$. Thus the steps enable highly concentrated $^{18}O$ (for example, 20 atom % or higher) as well as highly concentrated $^{17}O$ to be obtained.

The $^{17}O$-enriched oxygen (for example, 5 atom % or higher) or the 18O-enriched oxygen (for example, 20 atom % or higher) obtained by the method of the present invention can be used to manufacture $^{17}O$-enriched water or $^{18}O$-enriched water having 1 atom % or higher concentration of desired oxygen isotope, by the ordinary method, such as diluting with argon, adding hydrogen in a quantity that corresponds to the quantity of oxygen and causing oxygen and hydrogen react on a platinum catalyst at a temperature of 80° C. or higher.

First Embodiment

The first embodiment, that is the most basic embodiment of the present invention, is schematically shown in FIG. 1. This embodiment employs an apparatus including a distillation column 1 where oxygen is distilled so as to separate oxygen isotopes and a laser separation apparatus 2 which are connected to each other. This embodiment is characterized in that a first stage of $^{17}O$ concentration is carried out by distillation in a low $^{17}O$ concentration zone, and a second stage of $^{17}O$ concentration is carried out by laser separation when $^{17}O$ concentration has increased to 0.2 atom % or higher. This constitution enables efficient concentration of $^{17}O$.

It is preferable to use ultra-high purity oxygen as a starting material F. The ultra-high purity oxygen is preferably obtained by removing argon, hydrocarbons and other impurities from industrial-grade oxygen thereby significantly improving the chemical purity of oxygen. The oxygen distillation column may include a plurality of distillation columns connected in cascade, instead of the single distillation column 1. The distillation column may be filled with structured packing or unstructured packing, and a similar effect can be achieved regardless of whichever is used.

The constitution of the oxygen distillation column and the packing in the distillation column described above apply also to other embodiments.

Figure 2:
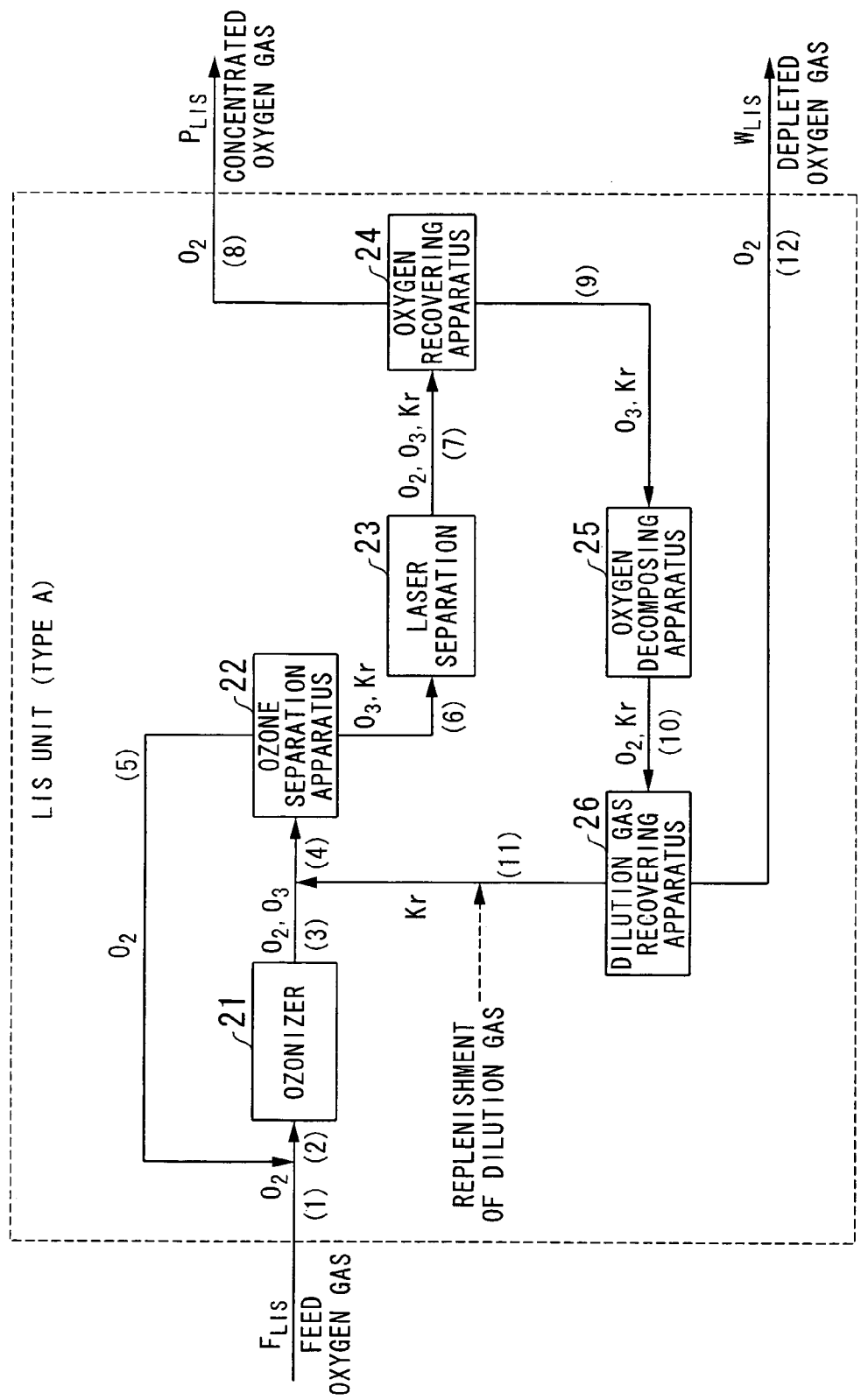
FIG. 2 is a schematic diagram showing an example of a laser separation apparatus used in the present invention.
Figure 3:
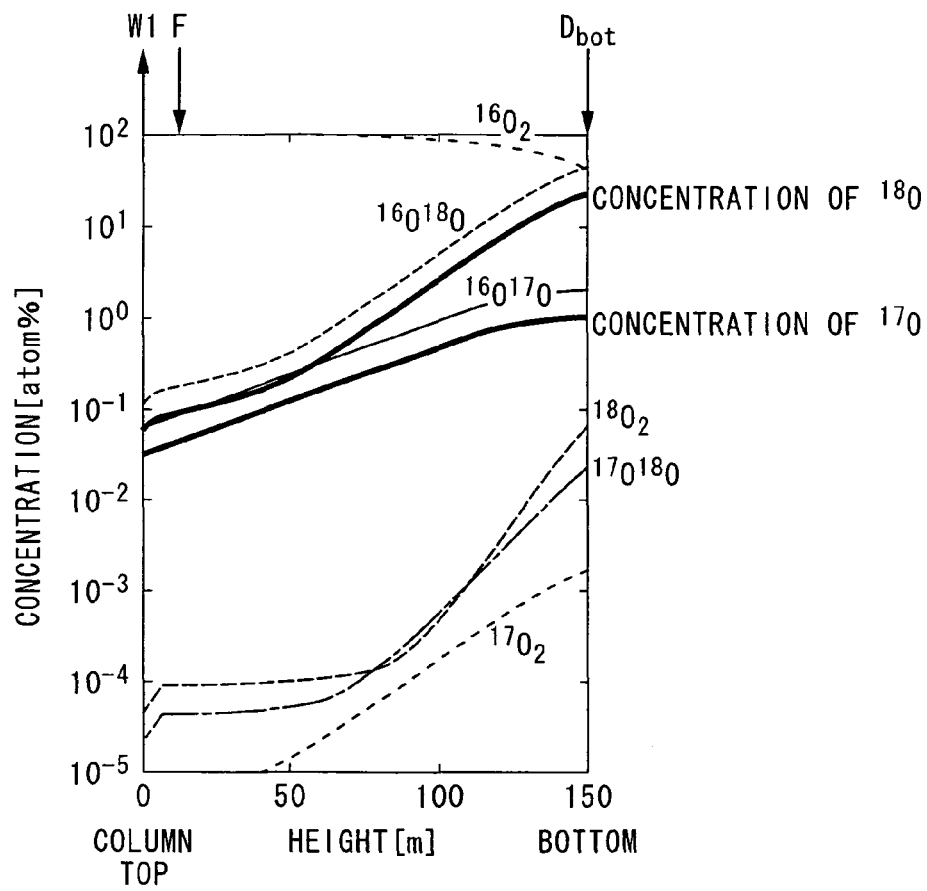
FIG. 3 is a graph showing the composition distribution of oxygen isotopes within a distillation column according to the first embodiment of the present invention.

The laser separation apparatus 2 (type A) used in this embodiment has the same constitution as that disclosed, for example, in Patent Documents 2 and 3, and an example thereof is shown in FIG. 2.

In this embodiment, the first stage of $^{17}O$ concentration is carried out in the distillation column 1, then oxygen gas $F_{LIS}$ is introduced into an ozonizer 21 so as to generate ozone, and ozone-oxygen mixture gas produced thereby is mixed with a dilution gas (Kr) and recovered dilution gas, followed by the separation of ozone and oxygen from the mixture gas by using an ozone separation apparatus 22. The separated oxygen is mixed with the oxygen gas $F_{LIS}$ supplied from the distillation column 1 and is used again in the generation of ozone. Meanwhile the separated ozone is charged together with the dilution gas to a laser separation apparatus 23, where ozone molecules that include $^{17}O$ are selectively decomposed into oxygen by irradiating with a laser beam of a particular wavelength. The $^{17}O$-enriched oxygen thus obtained, undecomposed ozone and the dilution gas are sent to an oxygen recovering apparatus 24, where $^{17}O$-enriched oxygen gas $P_{LIS}$ is obtained. The undecomposed ozone and the dilution gas that remain are sent to an ozone separation apparatus 25, where all ozone molecules are decomposed into oxygen. The resultant oxygen gas and the dilution gas are sent to a dilution gas recovering apparatus 26 where $^{17}O$-depleted and $^{18}O$-enriched oxygen gas $W_{LIS}$ is separated, while the recovered dilution gas is added again to the mixture gas of ozone produced in the ozonizer 21 and oxygen.

While this embodiment uses Kr as the gas for diluting ozone, other gases capable of diluting ozone without compromising the effects of the present invention may be also used.

There is no restriction on the details of the step carried out in the laser separation apparatus (LIS unit), as long as there is the function of separating the oxygen of the starting material into isotope-enriched oxygen and isotope-depleted oxygen by making use of the photodissociation reaction of ozone.

The above applies to the other embodiments as well.

The operation of this embodiment proceeds as follows. First, oxygen $D_{bot}$ ($F_{LIS}$ in FIG. 2) that is enriched in $^{17}O$ by distillation is drawn from the bottom of the distillation column 1, and is sent to the laser separation apparatus 2 where ozone including $^{17}O$ is selectively decomposed so as to obtain 17O-enriched oxygen P ($P_{LIS}$ in FIG. 2). Waste gas W1 generated during distillation is discarded through the top of the distillation column 1, and waste gas W2 ($W_{LIS}$ in FIG. 2) generated during laser separation is discarded from the laser separation apparatus 2. However, the waste gas W2 includes $^{17}O$ and $^{18}O$ of higher concentrations than in the starting material F, and therefore can be supplied to a separate $^{17}O$ concentrating step or $^{18}O$ concentrating step. Such a reuse of the waste gas W2 can be made similarly in many other embodiment described below.

The concentration step was simulated on a computer by assuming the distillation column 1 as having the specifications shown in Table 3, the laser separation apparatus 2 as having the specifications shown in Table 4, and the ultra-high purity oxygen F of the starting material as having the composition shown in Table 2. Flow rates of oxygen and the composition of oxygen isotopes in various points of the apparatus determined by the simulation are shown in Table 5. The composition distribution of oxygen isotopes within the distillation column 1 is shown in Table 3. Purity (atom %) of each isotope given in Table 5 was calculated by the equation shown under Table 5 by using the concentration (mol %) of oxygen gas including the respective isotope determined in the simulation. This applies also to the other embodiments. The computer program for the distillation step used in this simulation is explained in WO00/27509. Composition of the ultra-high purity oxygen F shown in Table 2 was calculated from the values of natural abundance shown in Table 1.

TABLE 2

| Isotope | Atomic mass | Abundance |
|---|---|---|
| $^{16}O_2$ | 32 | 0.99519 |
| $^{16}O^{17}O$ | 33 | 0.00074 |
| $^{16}O^{18}O$ | 34 | 0.00407 |
| $^{17}O_2$ | 34 | $1.37 \times 10^{-7}$ |
| $^{17}O^{18}O$ | 35 | $1.51 \times 10^{-6}$ |
| $^{18}O_2$ | 36 | $4.16 \times 10^{-6}$ |

Calculated from the values of natural abundance shown in Table 1.

TABLE 3

| Type of distillation column | Packing column |
|---|---|
| Column diameter | 0.120 m |
| Packing height | 150 m |
| Packing | Φ 5 mm Raschig ring |
| Operating pressure | 20 kPa(G) |
| Heat exchange capacity of reboiler | 2.7 kW |

TABLE 4

| LIS unit (TYPE A) | Flow rate [mol/s] | Molar fraction | | |
|---|---|---|---|---|
| | | $O_2$ | $O_3$ | Kr |
| (1) LIS unit feed ($O_2$) | 5.88E−06 | 1.00 | — | — |
| (2) Inlet of ozonizer: $O_2$ processing capacity of ozonizer | 4.12E−05 | 1.00 | — | — |
| (3) Outlet of ozonizer | 3.92E−05 | 0.90 | 0.10 | — |
| (4) $O_3$ separation column feed | 7.45E−05 | 0.47 | 0.05 | 0.47 |
| (5) $O_3$ separation column top = Waste $O_2$ gas | 3.53E−05 | 1.00 | — | — |
| (6) $O_3$ separation column bottom = LIS feed ($O_3$, Kr) | 3.92E−05 | — | 0.10 | 0.90 |
| (7) LIS outlet = $O_2$ separation column feed ($O_2$, $O_3$, Kr) | 3.93E−05 | 0.01 | 0.10 | 0.90 |
| (8) $O_2$ separation column top = LIS concentration $O_2$ | 2.33E−07 | 1.00 | — | — |
| (9) $O_2$ separation column bottom = Ozone separation apparatus inlet ($O_3$, Kr) | 3.91E−05 | — | 0.10 | 0.90 |
| (10) Ozone separation apparatus outlet = Kr recovery inlet ($O_2$, Kr) | 4.10E−05 | 0.14 | — | 0.86 |
| (11) Kr recovery outlet (Kr): Circulating quantity of Kr | 3.53E−05 | — | — | 1.00 |
| (12) Kr recovery outlet ($O_2$): LIS depletion $O_2$ | 5.65E−06 | 1.00 | — | — |

Ozonizer unit requirement (g$O_3$/kWh)   220
Ozonizer $O_3$ generating capacity (kg$O_3$/h)   6.78E−04
Ozonizer power consumption (kW)   3.08E−03
Target for laser separation   $^{16}O^{16}O^{17}O$
Decomposition ratio of the target   90%
Laser output power (W)   0.009

TABLE 5

| | | F | W1 | $D_{bot}$ | W2 | P |
|---|---|---|---|---|---|---|
| Flow rate [mol/s] | | 1.0e−3 | 9.94e−4 | 5.88e−6 | 5.65e−6 | 2.33e−7 |
| Composition [mol %] | $^{16}O_2$ | 9.95e−1 | 9.98e−1 | 4.84e−1 | 5.48e−1 | 5.93e−1 |
| | $^{16}O^{17}O$ | 7.38e−4 | 6.20e−4 | 2.07e−2 | 1.05e−2 | 1.41e−1 |
| | $^{16}O^{18}O$ | 4.07e−3 | 1.17e−3 | 4.94e−1 | 3.74e−1 | 2.13e−1 |
| | $^{17}O_2$ | 1.37e−7 | 3.94e−8 | 1.66e−5 | 5.07e−5 | 8.36e−3 |
| | $^{17}O^{18}O$ | 1.51e−6 | 2.47e−7 | 2.15e−4 | 3.59e−3 | 2.53e−2 |
| | $^{18}O_2$ | 4.16e−6 | 4.55e−7 | 6.31e−4 | 6.37e−2 | 1.91e−2 |
| Purity of isotope [atom %] | $^{16}O$ | 9.98e−1 | 9.99e−1 | 7.42e−1 | 7.41e−1 | 7.70e−1 |
| | $^{17}O$ | 3.70e−4 | 3.10e−4 | 1.05e−2 | 7.12e−3 | 9.14e−2 |
| | $^{18}O$ | 2.04e−3 | 5.85e−4 | 2.48e−1 | 2.52e−1 | 1.38e−1 |

Figure 4:
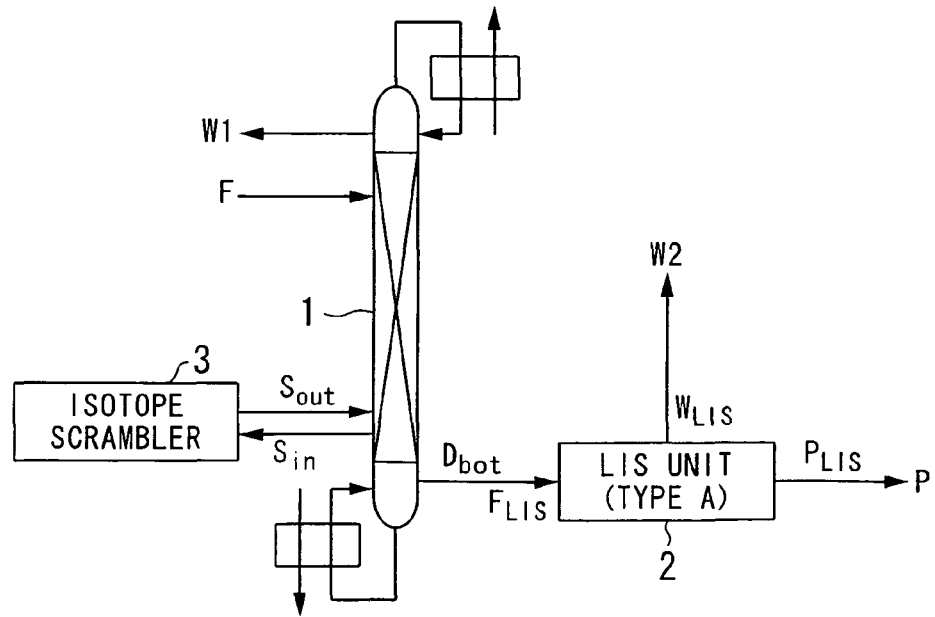
FIG. 4 is a schematic diagram showing a second embodiment of the present invention.
Figure 5:
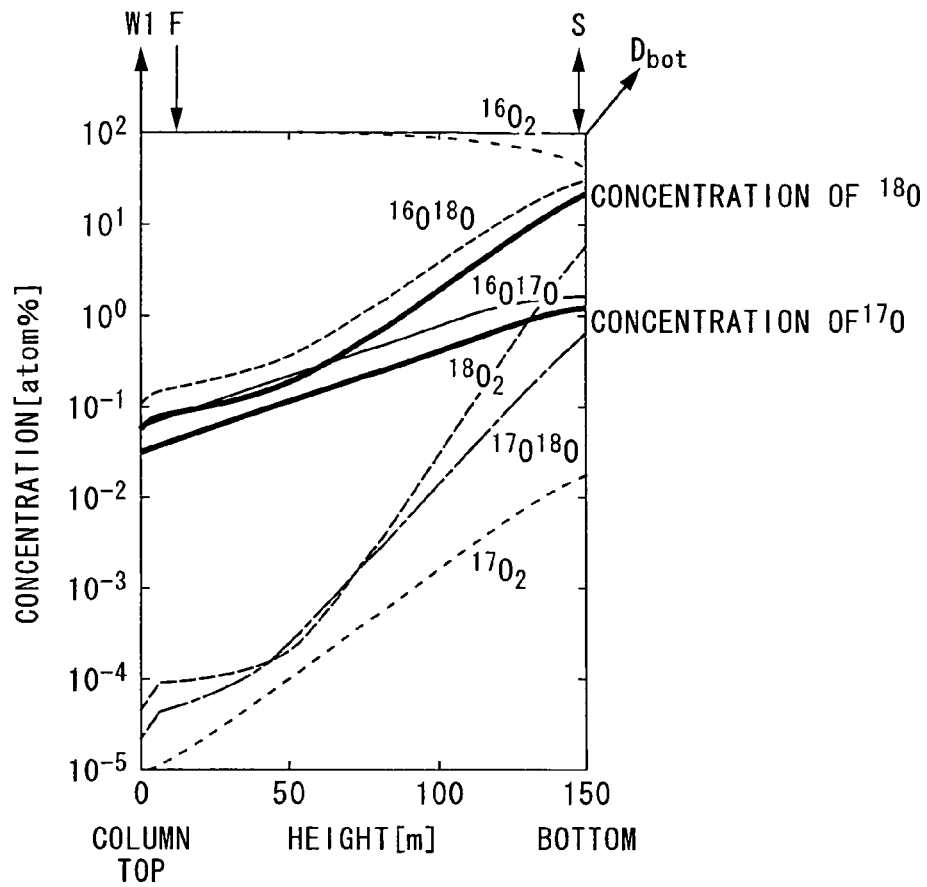
FIG. 5 is a graph showing the composition distribution of oxygen isotopes within a distillation column according to the second embodiment of the present invention.

Purity of isotope $^{16}O = {}^{16}O_2 + {}^{16}O^{17}O/2 + {}^{16}O^{18}O/2$
Purity of isotope $^{17}O = {}^{17}O_2 + {}^{16}O^{17}O/2 + {}^{17}O^{18}O/2$
Purity of isotope $^{18}O = {}^{18}O_2 + {}^{16}O^{18}O/2 + {}^{17}O^{18}O/2$ Second Embodiment The apparatus of this embodiment is the distillation column 1 of the first embodiment with an isotope scrambler 3 connected thereto. A schematic diagram of this apparatus is shown in FIG. 4.

The isotope scrambler 3 is an apparatus for promoting isotope scrambling, that is a phenomenon of isotope molecules of different isotope species which coexist randomly exchanging the constituent atoms, function thereof being described in detail in WO00/27509.

The isotope scrambler 3 may be connected to the distillation column 1 at any point thereof. A part of the gas is drawn from the distillation column 1, with the drawn gas being sent to the isotope scrambler 3, subjected to isotope scrambling and is returned to the distillation column. At this time, it is preferable to draw the gas from the distillation column 1 at a position near the column bottom or at the bottom. There is no restriction on the portion of the distillation column 1 where the gas is returned after the isotope scrambling. The gas may be returned at the same position where the gas was drawn, or near that position.

This embodiment is characterized by, in addition to the isotope concentrating effect of the first embodiment, the capability to promote the concentration of $^{17}O$ and $^{18}O$ in the distillation column by means of the isotope scrambler 3 so as to increase the $^{17}O$ concentration in the product P.

The operation of this apparatus was simulated on a computer by assuming the distillation column 1 as having the specifications shown in Table 3, the laser separation apparatus 2 as having the specifications shown in Table 6, and the ultra-high purity oxygen F of the starting material as having the composition shown in Table 2. Flow rates of oxygen and the composition of oxygen isotopes in various points of the apparatus determined by the simulation are shown in Tables 7 and 8. The composition distribution of oxygen isotopes within the distillation column 1 is shown in Table 5.

The simulation was based on the condition of drawing the gas from the distillation column 1 at the bottom at a rate of $10 \times 10^{-3}$ mol/s, and is returned to the bottom of the column after being processed in the isotope scrambler 3.

TABLE 6

| LIS unit (TYPE A) | Flow rate [mol/s] | Molar fraction | | |
|---|---|---|---|---|
| | | $O_2$ | $O_3$ | Kr |
| (1) LIS unit feed ($O_2$) | 6.19E−06 | 1.00 | — | — |
| (2) Inlet of ozonizer: $O_2$ processing capacity of ozonizer | 4.34E−05 | 1.00 | — | — |
| (3) Outlet of ozonizer | 4.13E−05 | 0.90 | 0.10 | — |
| (4) $O_3$ separation column feed | 7.85E−05 | 0.47 | 0.05 | 0.47 |
| (5) $O_3$ separation column top = Waste $O_2$ gas | 3.72E−05 | 1.00 | — | — |
| (6) $O_3$ separation column bottom = LIS feed ($O_3$, Kr) | 4.13E−05 | — | 0.10 | 0.90 |
| (7) LIS outlet = $O_2$ separation column feed ($O_2$, $O_3$, Kr) | 4.14E−05 | 0.01 | 0.10 | 0.90 |
| (8) $O_2$ separation column top = LIS concentration $O_2$ | 2.78E−07 | 1.00 | — | — |

TABLE 6-continued

| | | | | |
|---|---|---|---|---|
| (9) O$_2$ separation column bottom = Ozone separation apparatus inlet (O$_3$, Kr) | 4.11E−05 | — | 0.10 | 0.90 |
| (10) Ozone separation apparatus outlet = Kr recovery inlet (O$_2$, Kr) | 4.31E−05 | 0.14 | — | 0.86 |
| (11) Kr recovery outlet (Kr): Circulating quantity of Kr | 3.72E−05 | — | — | 1.00 |
| (12) Kr recovery outlet (O$_2$): LIS depletion O$_2$ | 5.92E−06 | 1.00 | — | — |

| | |
|---|---|
| Ozonizer unit requirement (gO$_3$/kWh) | 220 |
| Ozonizer O$_3$ generating capacity (kgO$_3$/h) | 7.14E−04 |
| Ozonizer power consumption (kW) | 3.24E−03 |
| Target for laser separation | $^{16}O^{16}O^{17}O$ |
| Decomposition ratio of the target | 90% |
| Laser output power (W) | 0.011 |

TABLE 7

| | | F | W1 | S$_{in}$ | S$_{out}$ |
|---|---|---|---|---|---|
| Flow rate [mol/s] | | 1.0e−3 | 9.94e−4 | 1.0e−3 | 1.0e−3 |
| Composition [mol %] | $^{16}O_2$ | 9.95e−1 | 9.98e−1 | 5.48e−1 | 5.48e−1 |
| | $^{16}O^{17}O$ | 7.38e−4 | 5.77e−4 | 1.99e−2 | 1.98e−2 |
| | $^{16}O^{18}O$ | 4.07e−3 | 1.02e−3 | 3.65e−1 | 3.65e−1 |
| | $^{17}O_2$ | 1.37e−7 | 7.25e−8 | 1.79e−4 | 1.80e−4 |
| | $^{17}O^{18}O$ | 1.51e−6 | 2.26e−7 | 6.56e−3 | 6.60e−3 |
| | $^{18}O_2$ | 4.16e−6 | 3.50e−7 | 6.02e−2 | 6.06e−2 |
| Purity of isotope [atom %] | $^{16}O$ | 9.98e−1 | 9.99e−1 | 7.40e−1 | 7.40e−1 |
| | $^{17}O$ | 3.70e−4 | 2.89e−4 | 1.34e−2 | 1.34e−2 |
| | $^{18}O$ | 2.04e−3 | 5.12e−4 | 2.46e−1 | 2.46e−1 |

TABLE 8

| | | D$_{bot}$ | W2 | P |
|---|---|---|---|---|
| Flow rate [mol/s] | | 6.19e−6 | 5.92e−6 | 2.78e−7 |
| Composition [mol %] | $^{16}O_2$ | 5.46e−1 | 5.45e−1 | 5.79e−1 |
| | $^{16}O^{17}O$ | 1.99e−2 | 1.36e−2 | 1.57e−1 |
| | $^{16}O^{18}O$ | 3.66e−1 | 3.73e−1 | 2.07e−1 |
| | $^{17}O_2$ | 1.79e−4 | 8.44e−5 | 1.07e−2 |
| | $^{17}O^{18}O$ | 6.59e−3 | 4.64e−3 | 2.81e−2 |
| | $^{18}O_2$ | 6.07e−2 | 6.37e−2 | 1.85e−2 |
| Purity of isotope [atom %] | $^{16}O$ | 7.39e−1 | 7.38e−1 | 7.61e−1 |
| | $^{17}O$ | 1.34e−2 | 9.19e−3 | 1.03e−1 |
| | $^{18}O$ | 2.47e−1 | 2.52e−1 | 1.36e−1 |

Third Embodiment

Figure 6:
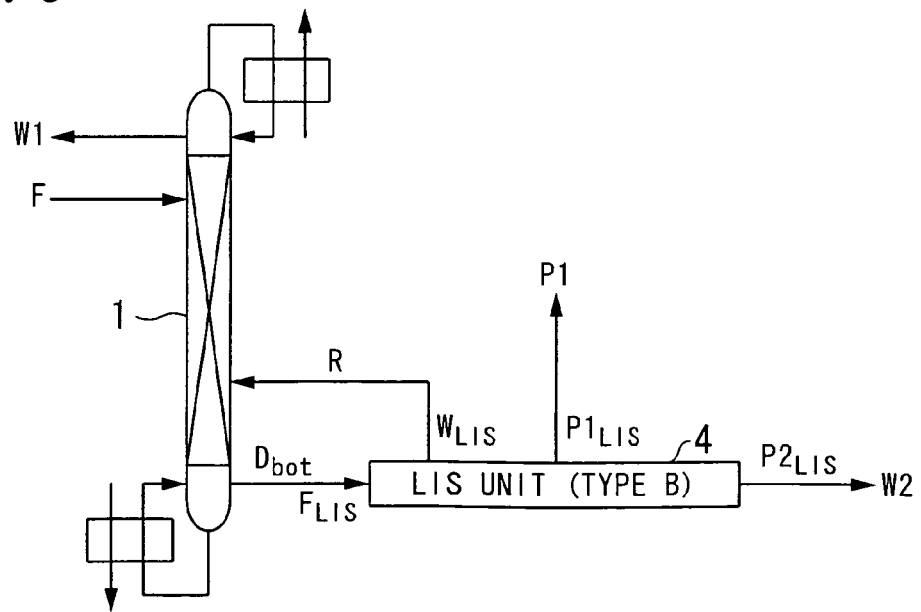
FIG. 6 is a schematic diagram showing a third embodiment of the present invention.

This embodiment is an advancement of the first embodiment, aimed at further improvements in the concentration and yield of $^{17}O$. The apparatus is schematically shown in FIG. 6.

Figure 7:
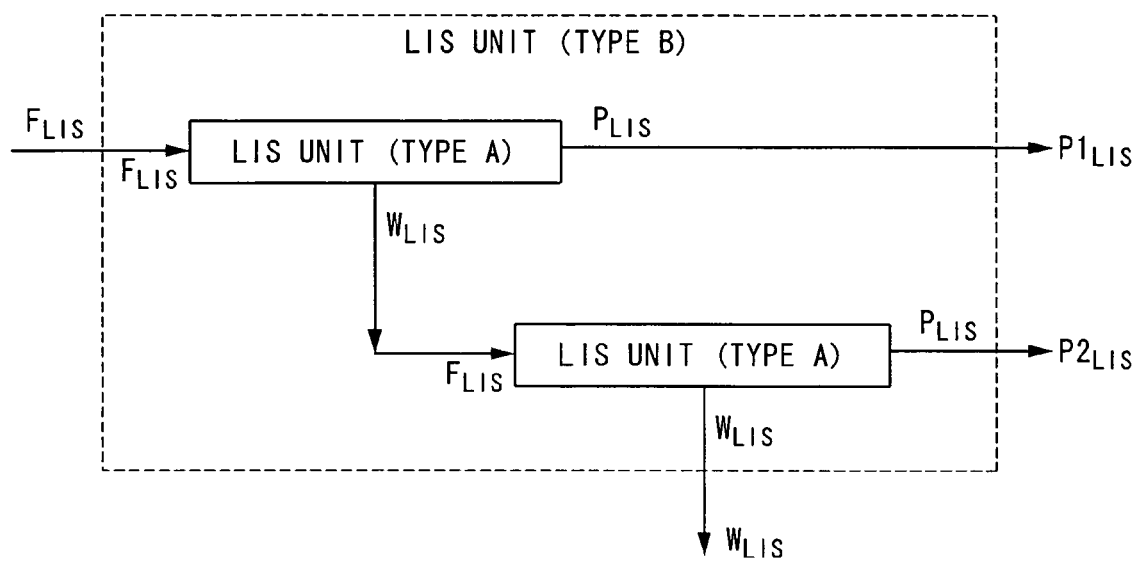
FIG. 7 is a schematic diagram showing an example of a laser separation apparatus used in the third embodiment of the present invention.
Figure 8:
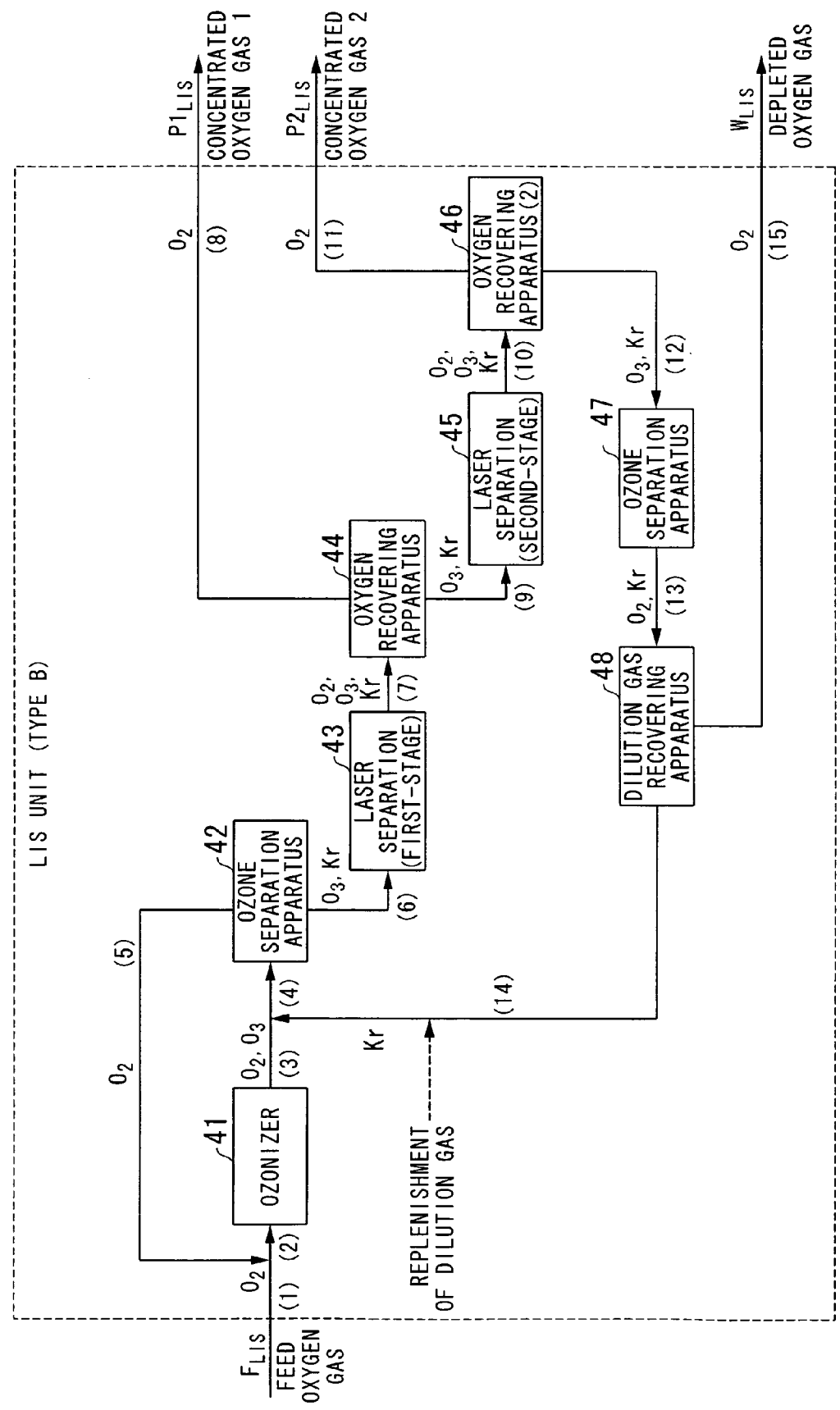
FIG. 8 is a schematic diagram showing an example of the laser separation apparatus used in the third embodiment of the present invention.
Figure 9:
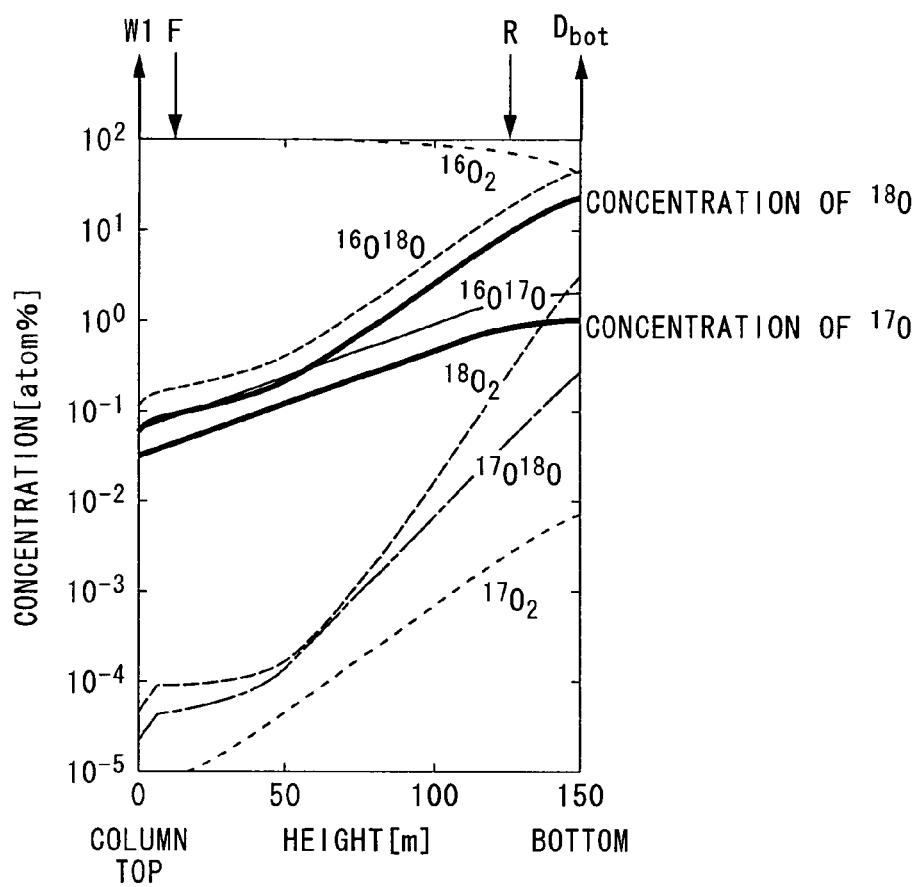
FIG. 9 is a graph showing the composition distribution of oxygen isotopes within the distillation column according to the third embodiment of the present invention.

A laser separation apparatus 4 (type B) is an apparatus for carrying out laser separation in two stages. The same function may be performed by two units of the laser separation apparatus 2 (type A) used in the first embodiment connected together as shown in FIG. 7. However, the constitution shown in FIG. 8, for example, enables a system with a single unit of each of the ozonizer and the dilution gas recovering apparatus to be constructed, and is therefore preferable.

In this apparatus, the first stage of $^{17}O$ concentration is carried out in the distillation column 1. Then, oxygen gas F$_{LIS}$ is introduced into an ozonizer 41 so as to generate ozone, and the produced ozone-oxygen mixture gas is mixed with a dilution gas (Kr) and recovered dilution gas. Then, by using an ozone separation apparatus 42, ozone and oxygen are separated from the mixture gas. Separated oxygen is mixed with the oxygen gas F$_{LIS}$ supplied from the distillation column 1 and is used again in the generation of ozone. Meanwhile, the separated ozone is charged together with the dilution gas to a first laser separation apparatus 43, where ozone molecules that include $^{17}O$ are selectively decomposed into oxygen by irradiating with a laser beam of a particular wavelength. Oxygen including $^{17}O$ thus obtained, undecomposed ozone and the dilution gas are sent to a first oxygen recovering apparatus 44, where $^{17}O$-enriched oxygen gas P$_{LIS}$ is obtained. The undecomposed ozone and the dilution gas that remain are sent to a second laser separation apparatus 45, where ozone molecules that include $^{18}O$ are selectively decomposed into oxygen by irradiating with a laser beam of a particular wavelength. The oxygen including $^{18}O$ thus obtained, the undecomposed ozone and the dilution gas are sent to a second recovering apparatus 46 where $^{18}O$-enriched oxygen gas P2$_{LIS}$ is obtained. The undecomposed ozone and the dilution gas that remain are sent to the ozone separation apparatus 47, where all ozone molecules are decomposed into oxygen. The resultant oxygen gas and the dilution gas are sent to a dilution gas recovering apparatus 48 where oxygen gas W$_{LIS}$ depleted in $^{17}O$ and $^{18}O$ is separated, while the recovered dilution gas is added again to the mixture gas of ozone produced in the ozonizer 41 and oxygen.

In the case of the first embodiment, the oxygen gas drawn from the bottom of the distillation column 1 is introduced into the laser separation apparatus 2, where the ozone molecule $^{16}O^{16}O^{17}O$ that includes $^{17}O$ is selectively decomposed so as to obtain the $^{17}O$-enriched oxygen gas P, while $^{17}O$-depleted oxygen gas that remains is discarded as waste gas W2 without returning it into the distillation column 1, to prevent the concentration of $^{17}O$ from decreasing due to the increasing concentration of $^{18}O$ in the distillation column 1. This is because returning the $^{18}O$-enriched gas W2 to the distillation column 1 causes further concentration of $^{18}O$ at the bottom of the distillation column 1, thus resulting in decreasing concentration of $^{17}O$ at the bottom of the distillation column 1.

In this embodiment, the ozone molecule $^{16}O^{16}O^{18}O$ that includes $^{18}O$ is selectively decomposed by the second-stage laser separation from ozone that has been depleted in $^{17}O$ in the first-stage laser separation, so as to remove the $^{18}O$-enriched oxygen gas, while the remainder of oxygen gas R (W$_{LIS}$ in FIG. 8) is returned to the distillation column at the intermediate portion thereof by means of a blower or the like (not shown). This scheme enhances the concentration of $^{17}O$ and improves the yield of $^{17}O$ while preventing $^{18}O$ from being concentrated in the distillation column 1.

The operation was simulated on a computer by assuming the distillation column 1 as having the specifications shown in Table 3, the laser separation apparatus 4 as having the specifications shown in Table 10, and the ultra-high purity oxygen F of the starting material as having the composition shown in Table 2. Flow rates of oxygen and the composition of oxygen isotopes in various points of the apparatus determined by the simulation are shown in Table 9. It can be seen that P1 is enriched in $^{17}O$ and W2 is enriched in $^{18}O$.

The composition distribution of oxygen isotopes within the distillation column 1 is shown in Table 9.

TABLE 9

| | | F | W1 | $D_{bot}$ | R | W2 | P1 |
|---|---|---|---|---|---|---|---|
| Flow rate [mol/s] | | 1.00e−3 | 9.95e−4 | 1.29e−5 | 7.47e−6 | 4.86e−6 | 5.38e−7 |
| Composition [mol %] | $^{16}O_2$ | 9.95e−1 | 9.98e−1 | 5.15e−1 | 5.82e−1 | 4.95e−1 | 5.87e−1 |
| | $^{16}O^{17}O$ | 7.38e−4 | 5.99e−4 | 2.03e−2 | 1.60e−2 | 5.73e−3 | 1.48e−1 |
| | $^{16}O^{18}O$ | 4.07e−3 | 1.10e−3 | 4.32e−1 | 3.45e−1 | 4.11e−1 | 2.10e−1 |
| | $^{17}O_2$ | 1.37e−7 | 5.03e−8 | 7.06e−5 | 1.10e−4 | 1.66e−5 | 9.33e−3 |
| | $^{17}O^{18}O$ | 1.51e−6 | 2.36e−7 | 2.86e−3 | 4.75e−3 | 2.38e−3 | 2.65e−2 |
| | $^{18}O_2$ | 4.16e−6 | 4.03e−7 | 3.00e−2 | 5.12e−2 | 8.53e−2 | 1.88e−2 |
| Purity of isotope [atom %] | $^{16}O$ | 9.98e−1 | 9.99e−1 | 7.41e−1 | 7.63e−1 | 7.04e−1 | 7.66e−1 |
| | $^{17}O$ | 3.70e−4 | 3.00e−4 | 1.17e−2 | 1.05e−2 | 4.07e−3 | 9.66e−2 |
| | $^{18}O$ | 2.04e−3 | 5.50e−4 | 2.47e−1 | 2.26e−1 | 2.92e−1 | 1.37e−1 |

TABLE 10

| | Flow rate [mol/s] | Molar fraction | | |
|---|---|---|---|---|
| LIS unit (TYPE B) | | $O_2$ | $O_3$ | Kr |
| (1) LIS unit feed ($O_2$) | 1.29E−05 | 1.00 | — | — |
| (2) Inlet of ozonizer: $O_2$ processing capacity of ozonizer | 9.01E−05 | 1.00 | — | — |
| (3) Outlet of ozonizer | 8.58E−05 | 0.90 | 0.10 | — |
| (4) $O_3$ separation column feed | 1.63E−04 | 0.47 | 0.05 | 0.47 |
| (5) $O_3$ separation column top = Waste $O_2$ gas | 7.72E−05 | 1.00 | — | — |
| (6) $O_3$ separation column bottom = LIS first-stage feed ($O_3$, Kr) | 8.58E−05 | — | 0.10 | 0.90 |
| (7) LIS outlet = $O_2$ separation column feed ($O_2$, $O_3$, Kr) | 8.59E−05 | 0.01 | 0.10 | 0.90 |
| (8) $O_2$ separation column top = LIS concentration $O_2$-1 | 5.38E−07 | 1.00 | — | — |
| (9) $O_2$ separation column bottom = LIS second-stage feed ($O_3$, Kr) | 8.54E−05 | — | 0.10 | 0.90 |
| (10) LIS outlet = $O_2$ separation column feed ($O_2$, $O_3$, Kr) | 8.70E−05 | 0.06 | 0.06 | 0.89 |
| (11) $O_2$ separation column top = LIS concentration $O_2$-2 | 4.86E−06 | 1.00 | — | — |
| (12) $O_2$ separation column bottom = Ozone separation apparatus inlet ($O_3$, Kr) | 8.22E−05 | — | 0.06 | 0.94 |
| (13) Ozone separation apparatus outlet = Kr recovery inlet ($O_2$, Kr) | 8.47E−05 | 0.09 | — | 0.91 |
| (14) Kr recovery outlet (Kr): Circulating quantity of Kr | 7.72E−05 | — | — | 1.00 |
| (15) Kr recovery outlet ($O_2$): LIS depletion $O_2$ | 7.47E−06 | 1.00 | — | — |

| | |
|---|---|
| Ozonizer unit requirement (g$O_3$/kWh) | 220 |
| Ozonizer $O_3$ generating capacity (kg$O_3$/h) | 1.48E−03 |
| Ozonizer power consumption (kW) | 6.74E−03 |
| Target for laser separation (first-stage) | $^{16}O^{16}O^{17}O$ |
| Decomposition ratio of the target | 90% |
| Laser output power (W) | 0.022 |
| Target for laser separation (second-stage) | $^{16}O^{16}O^{18}O$ |
| Decomposition ratio of the target | 90% |
| Laser output power (W) | 0.195 |

Fourth Embodiment

Figure 10:
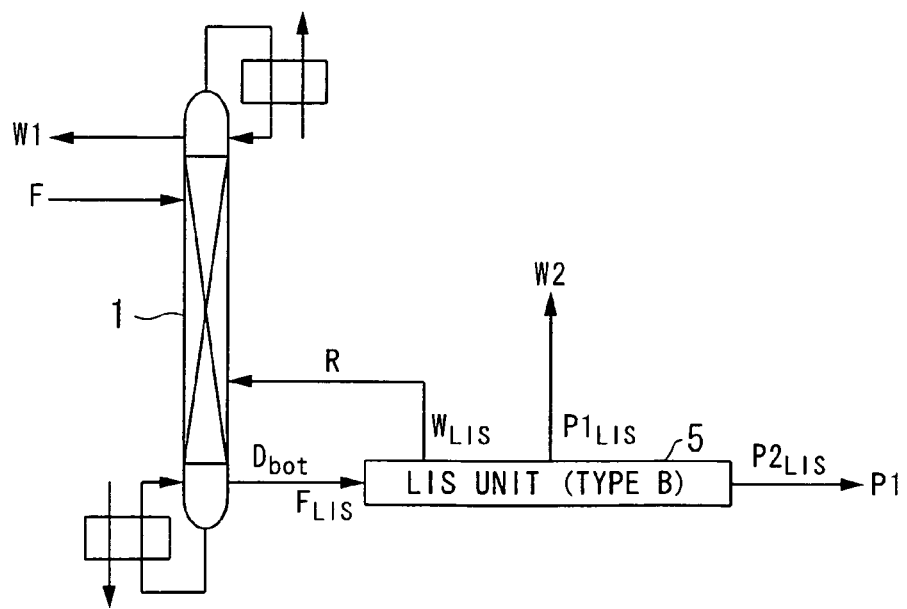
FIG. 10 is a schematic diagram showing a fourth embodiment of the present invention.

In the case of the third embodiment, $^{17}O$ is concentrated in the first-stage laser separation and $^{18}O$ is concentrated in the second-stage laser separation, although these operations may be carried out in the reverse order. FIG. 10 schematically shows this embodiment that uses a laser separation apparatus 5 designed to first selectively decompose ozone molecules that include $^{18}O$, followed by selective decomposition of ozone molecules that include $^{17}O$. In this embodiment also, $^{17}O$ and $^{18}O$ can be concentrated, and the concentration and yield of $^{17}O$ can be improved over those in the first embodiment.

Figure 11:
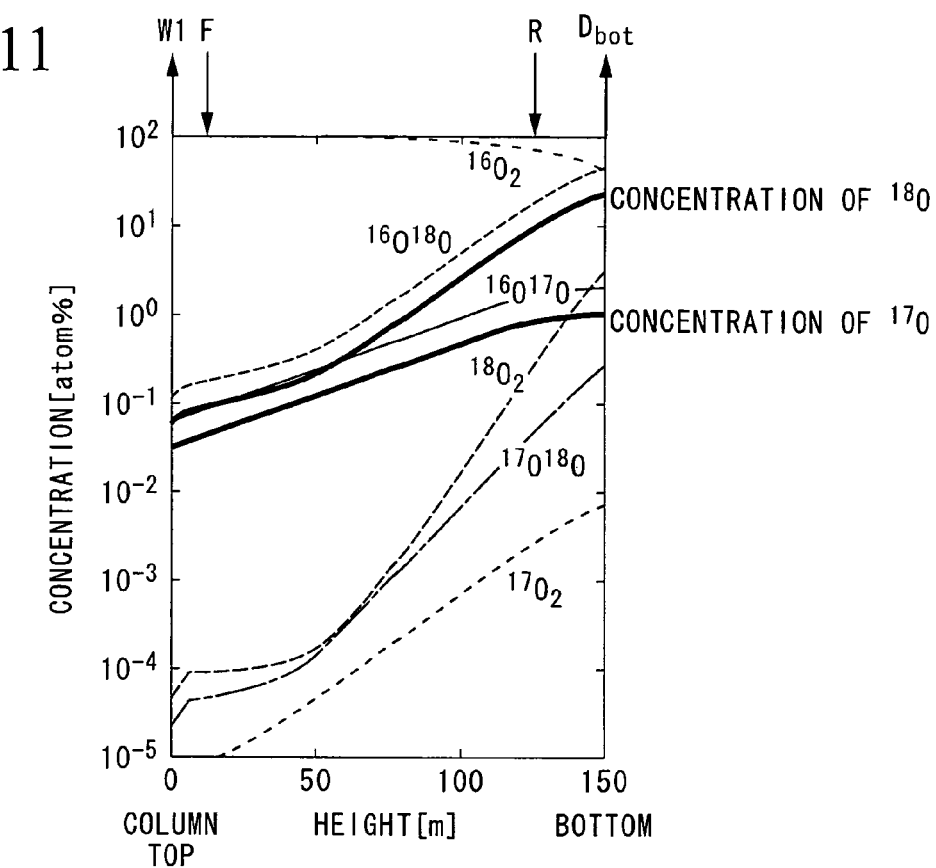
FIG. 11 is a graph showing the composition distribution of oxygen isotopes within a distillation column according to the fourth embodiment of the present invention.

The operation was simulated on a computer by assuming the distillation column 1 as having the specifications shown in Table 3, the laser separation apparatus 5 as having the specifications shown in Table 12, and the ultra-high purity oxygen F of the starting material as having the composition shown in Table 2. Flow rates of oxygen and the composition of isotopes in various points of the apparatus determined by the simulation are shown in Table 11. The composition distribution of oxygen isotopes within the distillation column 1 is shown in FIG. 11. It can be seen that P1 is enriched in $^{17}O$ and W2 is enriched in $^{18}O$.

TABLE 11

| | | F | W1 | $D_{bot}$ | R | W2 | P1 |
|---|---|---|---|---|---|---|---|
| Flow rate [mol/s] | | 1.00e−3 | 9.95e−4 | 1.28e−5 | 7.43e−6 | 4.99e−6 | 4.03e−7 |
| Composition [mol %] | $^{16}O_2$ | 9.95e−1 | 9.98e−1 | 5.14e−1 | 5.83e−1 | 4.96e−1 | 5.94e−1 |
| | $^{16}O^{17}O$ | 7.38e−4 | 5.97e−4 | 2.01e−2 | 1.53e−2 | 8.29e−3 | 1.67e−1 |
| | $^{16}O^{18}O$ | 4.07e−3 | 1.09e−3 | 4.33e−1 | 3.46e−1 | 4.08e−1 | 1.86e−1 |
| | $^{17}O_2$ | 1.37e−7 | 4.88e−8 | 6.50e−5 | 1.00e−4 | 3.46e−5 | 1.18e−2 |
| | $^{17}O^{18}O$ | 1.51e−6 | 2.33e−7 | 2.72e−3 | 4.53e−3 | 3.41e−3 | 2.62e−2 |
| | $^{18}O_2$ | 4.16e−6 | 3.96e−7 | 2.99e−2 | 5.12e−2 | 8.40e−2 | 1.46e−2 |
| Purity of isotope [atom %] | $^{16}O$ | 9.98e−1 | 9.99e−1 | 7.41e−1 | 7.64e−1 | 7.04e−1 | 7.71e−1 |
| | $^{17}O$ | 3.70e−4 | 2.99e−4 | 1.15e−2 | 1.00e−2 | 5.88e−3 | 1.08e−1 |
| | $^{18}O$ | 2.04e−3 | 5.47e−4 | 2.48e−1 | 2.26e−1 | 2.90e−1 | 1.21e−1 |

TABLE 12

| LIS unit (TYPE B) | Flow rate [mol/s] | Molar fraction | | |
|---|---|---|---|---|
| | | $O_2$ | $O_3$ | Kr |
| (1) LIS unit feed ($O_2$) | 1.28E−05 | 1.00 | — | — |
| (2) Inlet of ozonizer: $O_2$ processing capacity of ozonizer | 8.98E−05 | 1.00 | — | — |
| (3) Outlet of ozonizer | 8.55E−05 | 0.90 | 0.10 | — |
| (4) $O_3$ separation column feed | 1.62E−04 | 0.47 | 0.05 | 0.47 |
| (5) $O_3$ separation column top = Waste $O_2$ gas | 7.69E−05 | 1.00 | — | — |
| (6) $O_3$ separation column bottom = LIS first-stage feed ($O_3$, Kr) | 8.55E−05 | — | 0.10 | 0.90 |
| (7) LIS outlet = $O_2$ separation column feed ($O_2$, $O_3$, Kr) | 8.71E−05 | 0.06 | 0.06 | 0.88 |
| (8) $O_2$ separation column top = LIS concentration $O_2$-1 | 4.99E−06 | 1.00 | — | — |
| (9) $O_2$ separation column bottom = LIS second-stage feed ($O_3$, Kr) | 8.22E−05 | — | 0.06 | 0.94 |
| (10) LIS outlet = $O_2$ separation column feed ($O_2$, $O_3$, Kr) | 8.23E−05 | 0.00 | 0.06 | 0.93 |
| (11) $O_2$ separation column top = LIS concentration $O_2$-2 | 4.03E−07 | 1.00 | — | — |
| (12) $O_2$ separation column bottom = Ozone separation apparatus inlet ($O_3$, Kr) | 8.19E−05 | — | 0.06 | 0.94 |
| (13) Ozone separation apparatus outlet = Kr recovery inlet ($O_2$, Kr) | 8.44E−05 | 0.09 | — | 0.91 |
| (14) Kr recovery outlet (Kr): Circulating quantity of Kr | 7.69E−05 | — | — | 1.00 |
| (15) Kr recovery outlet ($O_2$): LIS depletion $O_2$ | 7.43E−06 | 1.00 | — | — |

| | |
|---|---|
| Ozonizer unit requirement (g$O_3$/kWh) | 220 |
| Ozonizer $O_3$ generating capacity (kg$O_3$/h) | 1.48E−03 |
| Ozonizer power consumption (kW) | 6.71E−03 |
| Target for laser separation (first-stage) | $^{16}O^{16}O^{18}O$ |
| Decomposition ratio of the target | 90% |
| Laser output power (W) | 0.201 |
| Target for laser separation (second-stage) | $^{16}O^{16}O^{17}O$ |
| Decomposition ratio of the target | 90% |
| Laser output power (W) | 0.016 |

Fifth Embodiment

Figure 12:
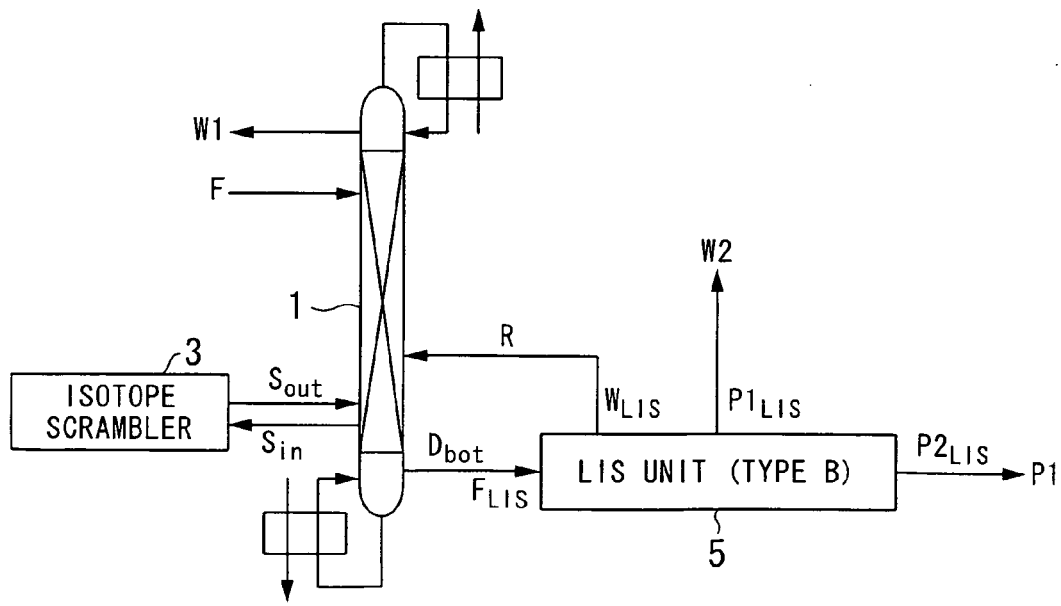
FIG. 12 is a schematic diagram showing a fifth embodiment of the present invention.

The apparatus of this embodiment is the distillation column 1 of the fourth embodiment with an isotope scrambler 3 connected thereto. This embodiment enhances the concentration of $^{17}O$ in the distillation column 1, and improves the concentration and the yield of $^{17}O$. A schematic diagram of this embodiment is shown in FIG. 12.

Figure 13:
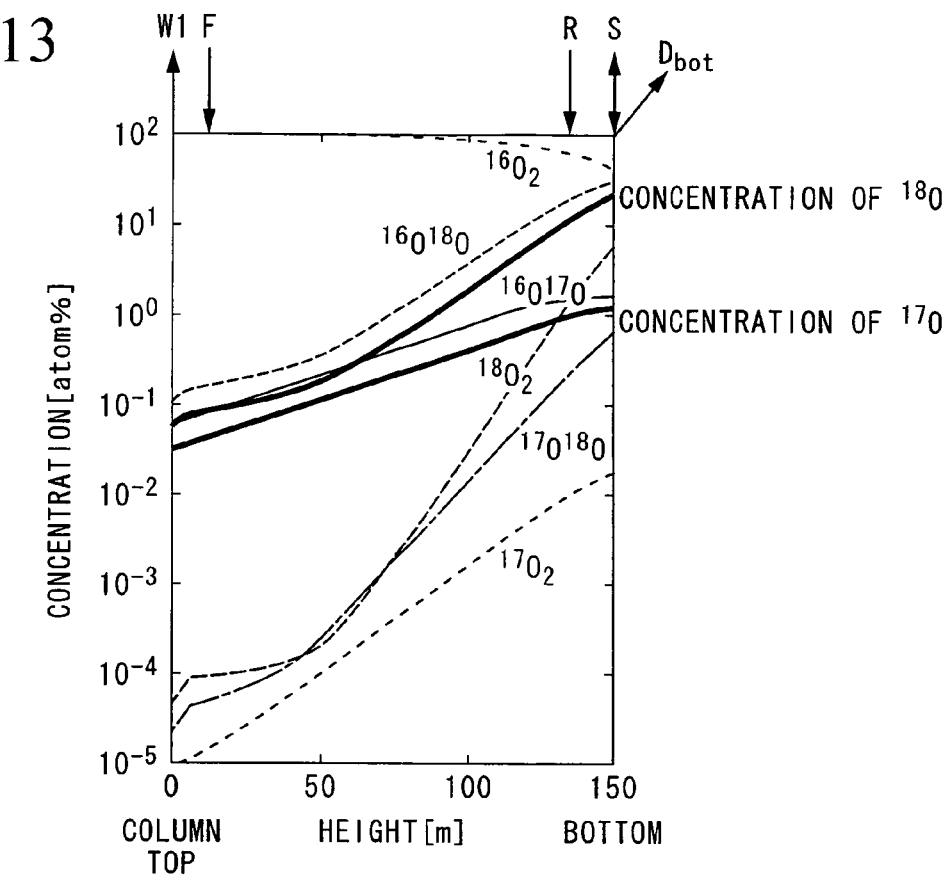
FIG. 13 is a graph showing the composition distribution of oxygen isotopes within the distillation column according to the fifth embodiment of the present invention.

The operation was simulated on a computer by assuming the distillation column 1 as having the specifications shown in Table 3, the laser separation apparatus 5 as having the specifications shown in Table 15, and the ultra-high purity oxygen F of the starting material as having the composition shown in Table 2. Flow rates of oxygen and the composition of isotopes in various points of the apparatus determined by the simulation are shown in Tables 13 and 14. It can be seen that P1 is enriched in $^{17}O$ and W2 is enriched in $^{18}O$. The composition distribution of oxygen isotopes within the distillation column 1 is shown in FIG. 13.

TABLE 13

| | | F | W1 | $S_{in}$ | $S_{out}$ |
|---|---|---|---|---|---|
| Flow rate [mol/s] | | 1.00e−3 | 9.94e−4 | 1.0e−3 | 1.0e−3 |
| Composition [mol %] | $^{16}O_2$ | 9.95e−1 | 9.98e−1 | 5.50e−1 | 5.51e−1 |
| | $^{16}O^{17}O$ | 7.38e−4 | 5.71e−4 | 1.94e−2 | 1.94e−2 |

TABLE 13-continued

| | | F | W1 | $S_{in}$ | $S_{out}$ |
|---|---|---|---|---|---|
| | $^{16}O^{18}O$ | 4.07e−3 | 1.01e−3 | 3.64e−1 | 3.63e−1 |
| | $^{17}O_2$ | 1.37e−7 | 7.02e−8 | 1.70e−4 | 1.71e−4 |
| | $^{17}O^{18}O$ | 1.51e−6 | 2.20e−7 | 6.35e−3 | 6.40e−3 |
| | $^{18}O_2$ | 4.16e−6 | 3.35e−7 | 5.95e−2 | 5.99e−2 |
| Purity of isotope [atom %] | $^{16}O$ | 9.98e−1 | 9.99e−1 | 7.42e−1 | 7.42e−1 |
| | $^{17}O$ | 3.70e−4 | 2.85e−4 | 1.31e−2 | 1.31e−2 |
| | $^{18}O$ | 2.04e−3 | 5.04e−4 | 2.45e−1 | 2.45e−1 |

TABLE 14

| | | $D_{bot}$ | R | W2 | P1 |
|---|---|---|---|---|---|
| Flow rate [mol/s] | | 1.33e−5 | 7.68e−6 | 5.14e−6 | 4.51e−7 |
| Composition [mol %] | $^{16}O_2$ | 5.49e−1 | 5.84e−1 | 4.96e−1 | 5.88e−1 |
| | $^{16}O^{17}O$ | 1.94e−2 | 1.74e−2 | 9.44e−3 | 1.76e−1 |
| | $^{16}O^{18}O$ | 3.65e−1 | 3.43e−1 | 4.07e−1 | 1.82e−1 |
| | $^{17}O_2$ | 1.70e−4 | 1.30e−4 | 4.49e−5 | 1.31e−2 |
| | $^{17}O^{18}O$ | 6.39e−3 | 5.12e−3 | 3.87e−3 | 2.72e−2 |
| | $^{18}O_2$ | 6.00e−2 | 5.04e−2 | 8.34e−2 | 1.41e−2 |
| Purity of isotope [atom %] | $^{16}O$ | 7.41e−1 | 7.64e−1 | 7.04e−1 | 7.67e−1 |
| | $^{17}O$ | 1.31e−2 | 1.14e−2 | 6.70e−3 | 1.15e−1 |
| | $^{18}O$ | 2.46e−1 | 2.24e−1 | 2.89e−1 | 1.19e−1 |

TABLE 15

| LIS unit (TYPE B) | Flow rate [mol/s] | Molar fraction | | |
|---|---|---|---|---|
| | | $O_2$ | $O_3$ | Kr |
| (1) LIS unit feed ($O_2$) | 1.33E−05 | 1.00 | — | — |
| (2) Inlet of ozonizer: $O_2$ processing capacity of ozonizer | 9.29E−05 | 1.00 | — | — |
| (3) Outlet of ozonizer | 8.85E−05 | 0.90 | 0.10 | — |
| (4) $O_3$ separation column feed | 1.68E−04 | 0.47 | 0.05 | 0.47 |
| (5) $O_3$ separation column top = Waste $O_2$ gas | 7.96E−05 | 1.00 | — | — |
| (6) $O_3$ separation column bottom = LIS first-stage feed ($O_3$, Kr) | 8.85E−05 | — | 0.10 | 0.90 |
| (7) LIS outlet = $O_2$ separation column feed ($O_2$, $O_3$, Kr) | 9.02E−05 | 0.06 | 0.06 | 0.88 |

TABLE 15-continued

| | | | | |
|---|---|---|---|---|
| (8) $O_2$ separation column top = LIS concentration $O_2$-1 | 5.14E−06 | 1.00 | — | — |
| (9) $O_2$ separation column bottom = LIS second-stage feed ($O_3$, Kr) | 8.51E−05 | — | 0.06 | 0.94 |
| (10) LIS outlet = $O_2$ separation column feed ($O_2$, $O_3$, Kr) | 8.52E−05 | 0.01 | 0.06 | 0.93 |
| (11) $O_2$ separation column top = LIS concentration $O_2$-2 | 4.51E−07 | 1.00 | — | — |
| (12) $O_2$ separation column bottom = Ozone separation apparatus inlet ($O_3$, Kr) | 8.48E−05 | — | 0.06 | 0.94 |
| (13) Ozone separation apparatus outlet = Kr recovery inlet ($O_2$, Kr) | 8.73E−05 | 0.09 | — | 0.91 |
| (14) Kr recovery outlet (Kr): Circulating quantity of Kr | 7.96E−05 | — | — | 1.00 |
| (15) Kr recovery outlet ($O_2$): LIS depletion $O_2$ | 7.68E−06 | 1.00 | — | — |

| | |
|---|---|
| Ozonizer unit requirement (g$O_3$/kWh) | 220 |
| Ozonizer $O_3$ generating capacity (kg$O_3$/h) | 1.53E−03 |
| Ozonizer power consumption (kW) | 6.95E−03 |
| Target for laser separation (first-stage) | $^{16}O^{16}O^{18}O$ |
| Decomposition ratio of the target | 90% |
| Laser output power (W) | 0.207 |
| Target for laser separation (second-stage) | $^{16}O^{16}O^{17}O$ |
| Decomposition ratio of the target | 90% |
| Laser output power (W) | 0.018 |

Sixth Embodiment

Figure 14:
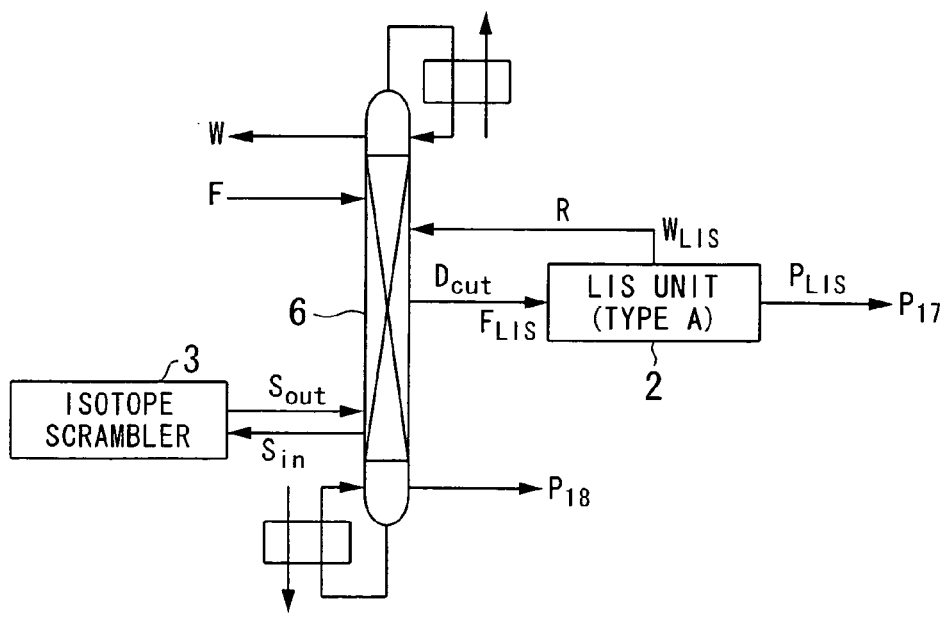
FIG. 14 is a schematic diagram showing a sixth embodiment of the present invention.

The apparatus of this embodiment includes a distillation column 6, the isotope scrambler 3 and the laser separation apparatus 2 connected to each other. The distillation column 6 has the same construction as the distillation column 1, except for being larger in height. The laser separation apparatus 2 is connected to the distillation column 6 in an intermediate portion of the column. The isotope scrambler 3 may be connected to the distillation column 6 at any point thereof similarly to the second embodiment, although the connecting point is preferably at the bottom of the column or in the vicinity thereof. There is no restriction on the position of the distillation column 6 where the gas is returned thereto, and the gas may be returned at the same position where the gas was drawn, or near that position. This embodiment is schematically illustrated in FIG. 14.

In this embodiment, $^{18}$O-enriched oxygen $P_{18}$ accumulates at the bottom of the distillation column 6. The intermediate component of $^{17}$O accumulates mainly in the form of $^{16}O^{17}O$ or $^{17}O^{18}O$ with highest concentration in the intermediate portion of the distillation column 6. Oxygen gas $D_{cut}$ is drawn from near the intermediate portion of the column.

Then, the oxygen gas $D_{cut}$ is fed to the laser separation apparatus 2, where the ozone molecule $^{16}O^{16}O^{17}O$ that includes $^{17}$O is selectively decomposed so as to obtain $^{17}$O-enriched oxygen $P_{17}$, while the remaining oxygen gas R is returned to the distillation column 6.

This embodiment is characterized in that the oxygen gas $D_{cut}$ is drawn from the distillation column 6 at the intermediate portion thereof where the concentration of $^{17}$O is highest, so that $^{17}$O can be separated efficiently and mixing of $^{18}$O into oxygen $P_{17}$ can be minimized, thereby making it possible to prevent the yield of $^{18}$O in oxygen $P_{18}$ from decreasing.

The concentration of $^{17}$O in the oxygen gas $D_{cut}$ is dependent on the height of the distillation column 6. In the case where $P_{18}$ has the same level of $^{18}$O concentration, the higher the height of the distillation column 6 the higher the concentration of $^{17}$O in the oxygen gas $D_{cut}$. Therefore, the height of the distillation column 6 is preferably 150 m or more. From a practical point of view, on the other hand, height of the distillation column 6 is preferably not larger than 600 m.

Figure 15:
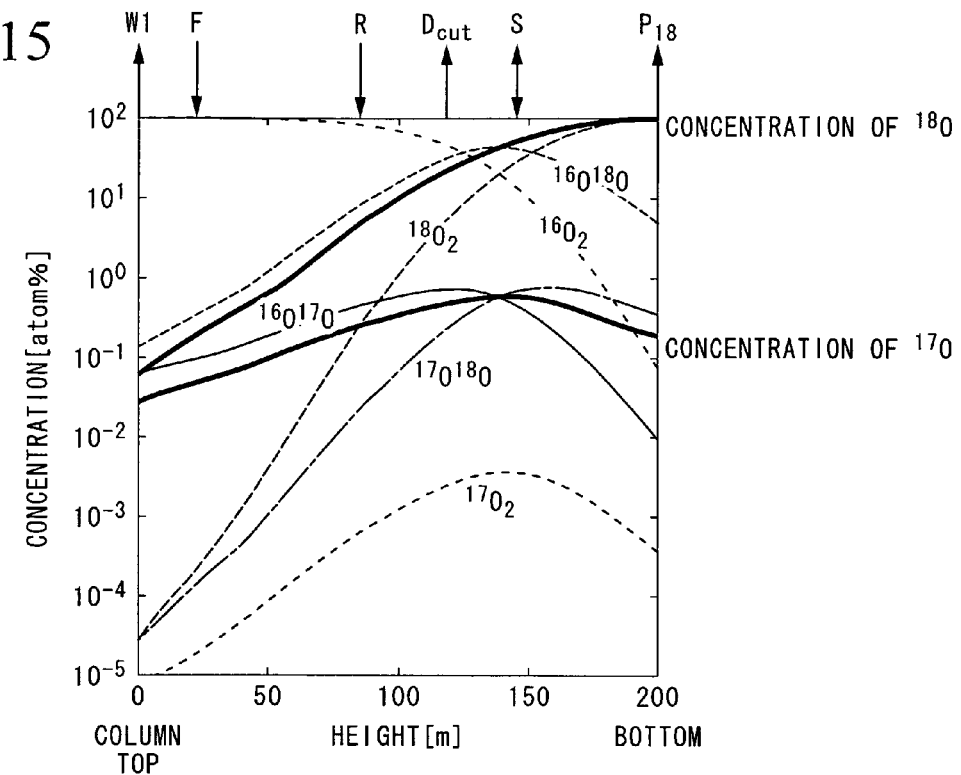
FIG. 15 is a graph showing the composition distribution of oxygen isotopes within a distillation column according to the sixth embodiment of the present invention.

The operation was simulated on a computer by assuming the distillation column 6 as having the specifications shown in Table 16, the laser separation apparatus 2 as having the specifications shown in Table 19, and the ultra-high purity oxygen F of the starting material as having the composition shown in Table 2. Flow rates of oxygen and the composition of isotopes in various points of the apparatus determined by the simulation are shown in Tables 17 and 18. The composition distribution of oxygen isotopes within the distillation column 6 is shown in FIG. 15. The concentration of $^{17}$O in the oxygen gas $D_{cut}$ under the conditions described above was 0.54 atom %.

TABLE 16

| | |
|---|---|
| Type of distillation column | Packing column |
| Column diameter | 0.120 m |
| Packing height | 200 m |
| Packing | Φ 5 mm Raschig ring |
| Operating pressure | 20 kPa(G) |
| Heat exchange capacity of reboiler | 2.7 kW |

TABLE 17

| | | F | W1 | $S_{in}$ | $S_{out}$ |
|---|---|---|---|---|---|
| Flow rate [mol/s] | | 1.00e−3 | 9.98e−4 | 1.0e−3 | 1.0e−3 |
| Composition [mol %] | $^{16}O_2$ | 9.95e−1 | 9.98e−1 | 2.45e−3 | 2.46e−1 |
| | $^{16}O^{17}O$ | 7.38e−4 | 6.12e−4 | 6.20e−3 | 6.17e−3 |
| | $^{16}O^{18}O$ | 4.07e−3 | 1.37e−3 | 4.96e−1 | 4.94e−1 |
| | $^{17}O_2$ | 1.37e−7 | 7.61e−8 | 3.82e−5 | 3.87e−5 |
| | $^{17}O^{18}O$ | 1.51e−6 | 2.90e−7 | 6.16e−3 | 6.19e−3 |
| | $^{18}O_2$ | 4.16e−6 | 2.69e−7 | 2.47e−1 | 2.48e−1 |
| Purity of isotope [atom %] | $^{16}O$ | 9.98e−1 | 9.99e−1 | 4.96e−1 | 4.96e−1 |
| | $^{17}O$ | 3.70e−4 | 3.06e−4 | 6.22e−3 | 6.22e−3 |
| | $^{18}O$ | 2.04e−3 | 6.84e−4 | 4.98e−1 | 4.98e−1 |

TABLE 18

| | | $D_{cut}$ | R | $P_{17}$ | $P_{18}$ |
|---|---|---|---|---|---|
| Flow rate [mol/s] | | 3.31e−5 | 3.21e−5 | 1.00e−6 | 1.25e−6 |
| Composition [mol %] | $^{16}O_2$ | 5.53e−1 | 5.52e−1 | 6.30e−1 | 6.79e−4 |
| | $^{16}O^{17}O$ | 8.13e−3 | 5.44e−3 | 9.85e−2 | 1.08e−4 |
| | $^{16}O^{18}O$ | 3.74e−1 | 3.77e−1 | 2.29e−1 | 5.44e−2 |
| | $^{17}O_2$ | 2.85e−5 | 1.34e−5 | 3.85e−3 | 4.18e−6 |
| | $^{17}O^{18}O$ | 2.66e−3 | 1.86e−3 | 1.79e−2 | 4.02e−3 |
| | $^{18}O_2$ | 6.21e−2 | 6.43e−2 | 2.08e−2 | 9.41e−1 |
| Purity of isotope [atom %] | $^{16}O$ | 7.44e−1 | 7.43e−1 | 7.94e−1 | 2.79e−2 |
| | $^{17}O$ | 5.43e−3 | 3.66e−3 | 6.21e−2 | 2.07e−3 |
| | $^{18}O$ | 2.50e−1 | 2.54e−1 | 1.44e−1 | 9.70e−1 |

TABLE 19

| LIS unit (TYPE A) | Flow rate [mol/s] | Molar fraction | | |
|---|---|---|---|---|
| | | $O_2$ | $O_3$ | Kr |
| (1) LIS unit feed ($O_2$) | 3.31E−05 | 1.00 | — | — |
| (2) Inlet of ozonizer: $O_2$ processing capacity of ozonizer | 2.32E−04 | 1.00 | — | — |
| (3) Outlet of ozonizer | 2.20E−04 | 0.90 | 0.10 | — |
| (4) $O_3$ separation column feed | 4.19E−04 | 0.47 | 0.05 | 0.47 |
| (5) $O_3$ separation column top = Waste $O_3$ gas | 1.98E−04 | 1.00 | — | — |
| (6) $O_3$ separation column bottom = LIS feed ($O_3$, Kr) | 2.20E−04 | — | 0.10 | 0.90 |
| (7) LIS outlet = $O_2$ separation column feed ($O_2$, $O_3$, Kr) | 2.21E−04 | 0.00 | 0.10 | 0.90 |
| (8) $O_2$ separation column top = LIS concentration $O_2$ | 1.00E−06 | 1.00 | — | — |
| (9) $O_2$ separation column bottom = Ozone separation apparatus inlet ($O_3$, Kr) | 2.20E−04 | — | 0.10 | 0.90 |
| (10) Ozone separation apparatus outlet = Kr recovery inlet ($O_2$, Kr) | 2.31E−04 | 0.14 | — | 0.86 |
| (11) Kr recovery outlet (Kr): Circulating quantity of Kr | 1.98E−04 | — | — | 1.00 |
| (12) Kr recovery outlet ($O_2$): LIS depletion $O_2$ | 3.21E−05 | 1.00 | — | — |

| | |
|---|---|
| Ozonizer unit requirement (g$O_3$/kWh) | 220 |
| Ozonizer $O_3$ generating capacity (kg$O_3$/h) | 3.81E−03 |
| Ozonizer power consumption (kW) | 1.73E−02 |
| Target for laser separation | $^{16}O^{16}O^{17}O$ |
| Decomposition ratio of the target | 90% |
| Laser output power (W) | 0.040 |

Seventh Embodiment

Figure 16:
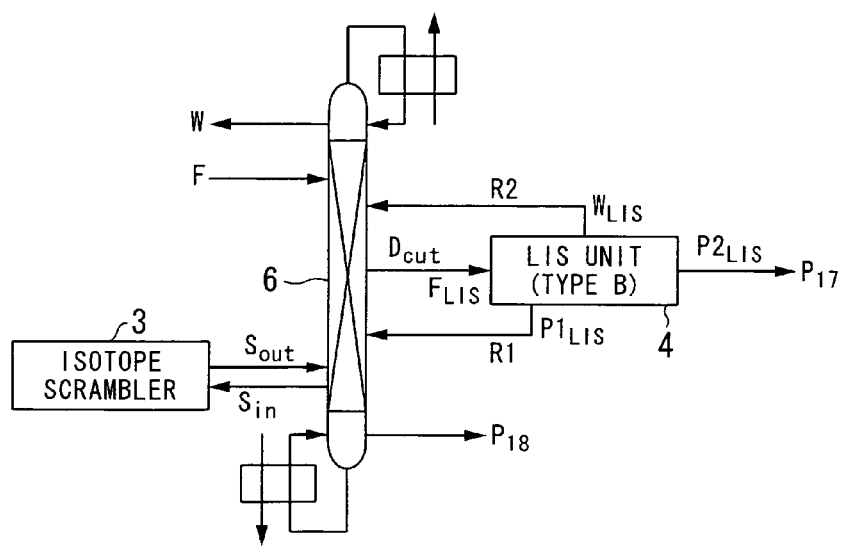
FIG. 16 is a schematic diagram showing a seventh embodiment of the present invention.

This embodiment has such a constitution as laser separation is carried out in two stages in the sixth embodiment, as shown in FIG. 16. The laser separation apparatus 4 (type B) may have either the constitution shown in FIG. 7 where two units of the laser separation apparatus 2 (type A) are connected as in the third embodiment, or the constitution shown in FIG. 8.

As oxygen R1 that has been enriched in $^{18}O$ by selectively decomposing $^{16}O^{16}O^{18}O$ in the first-stage ozone decomposition is returned to the distillation column 6, and $^{16}O^{16}O^{17}O$ is selectively decomposed in the second-stage ozone decomposition, for example, the concentration and the yield of $^{17}O$ can be further improved.

Figure 17:
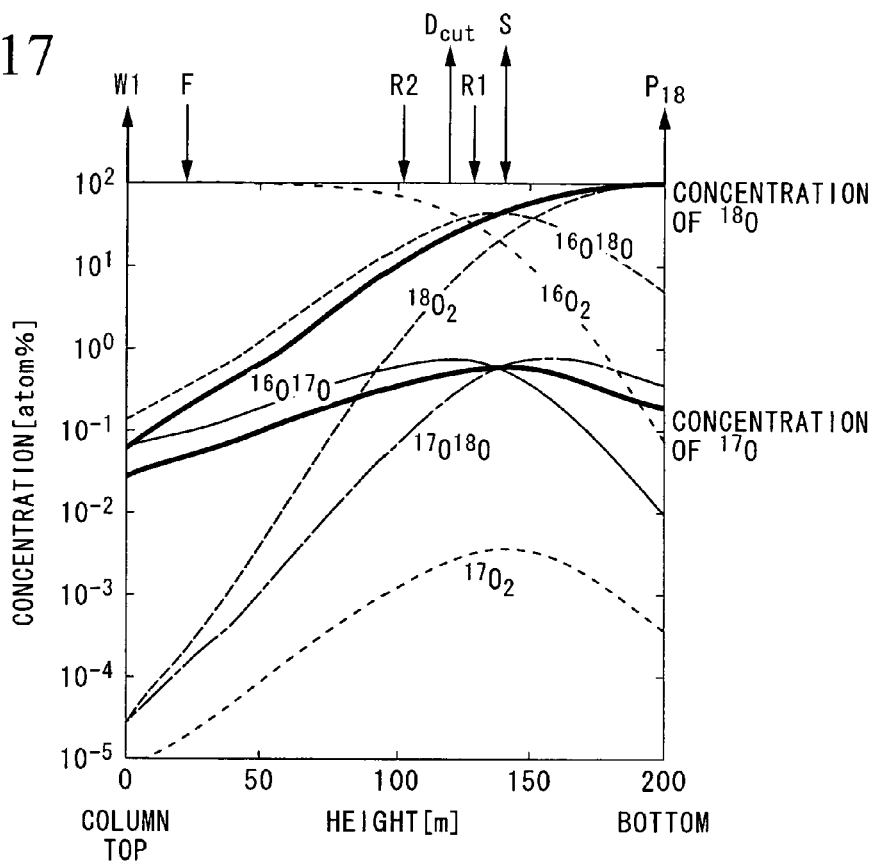
FIG. 17 is a graph showing the composition distribution of oxygen isotopes within a distillation column according to the seventh embodiment of the present invention.

The operation was simulated on a computer by assuming the distillation column 6 as having the specifications shown in Table 16, the laser separation apparatus 4 as having the constitution shown in FIG. 7 and the specifications shown in Table 22, and the ultra-high purity oxygen F of the starting material as having the composition shown in Table 2. Flow rates of oxygen and the composition of isotopes in various points of the apparatus determined by the simulation are shown in Tables 20 and 21. The composition distribution of oxygen isotopes within the distillation column 6 is shown in FIG. 17.

TABLE 20

| | F | W | $S_{in}$ | $S_{out}$ |
|---|---|---|---|---|
| Flow rate [mol/s] | 1.00e−3 | 9.94e−4 | 1.0e−3 | 1.0e−3 |
| Composition [mol %] $^{16}O_2$ | 9.95e−1 | 9.98e−1 | 2.45e−1 | 2.46e−1 |
| $^{16}O^{17}O$ | 7.38e−4 | 5.95e−4 | 5.84e−3 | 5.80e−3 |
| $^{16}O^{18}O$ | 4.07e−3 | 1.32e−3 | 4.96e−1 | 4.94e−1 |
| $^{17}O_2$ | 1.37e−7 | 6.86e−8 | 3.37e−5 | 3.41e−5 |
| $^{17}O^{18}O$ | 1.51e−6 | 2.50e−7 | 5.78e−3 | 5.82e−3 |
| $^{18}O_2$ | 4.16e−6 | 2.03e−7 | 2.47e−2 | 2.48e−1 |
| Purity of isotope [atom %] $^{16}O$ | 9.98e−1 | 9.99e−1 | 4.96e−1 | 4.96e−1 |
| $^{17}O$ | 3.70e−4 | 2.98e−4 | 5.84e−3 | 5.84e−3 |
| $^{18}O$ | 2.04e−3 | 6.61e−4 | 4.98e−1 | 4.98e−1 |

TABLE 21

| | $D_{cut}$ | R1 | R2 | $P_{17}$ | $P_{18}$ |
|---|---|---|---|---|---|
| Flow rate [mol/s] | 4.63e−5 | 1.82e−5 | 2.70e−5 | 1.00e−6 | 1.29e−6 |
| Composition [mol %] $^{16}O_2$ | 5.60e−1 | 5.02e−1 | 5.99e−1 | 6.48e−1 | 6.85e−4 |
| $^{16}O^{17}O$ | 7.68e−3 | 3.69e−3 | 6.72e−3 | 1.14e−1 | 1.02e−4 |
| $^{16}O^{18}O$ | 3.69e−1 | 4.09e−1 | 3.43e−1 | 2.00e−1 | 5.46e−2 |
| $^{17}O_2$ | 2.49e−5 | 6.78e−6 | 1.89e−5 | 4.97e−3 | 3.69e−6 |
| $^{17}O^{18}O$ | 2.45e−3 | 1.51e−3 | 1.92e−3 | 1.75e−2 | 3.78e−3 |
| $^{18}O_2$ | 6.01e−2 | 8.35e−2 | 4.91e−2 | 1.54e−2 | 9.41e−1 |
| Purity of isotope [atom %] $^{16}O$ | 7.49e−1 | 7.08e−1 | 7.74e−1 | 8.05e−1 | 2.81e−1 |
| $^{17}O$ | 5.09e−3 | 2.60e−3 | 4.34e−3 | 7.05e−2 | 1.94e−3 |
| $^{18}O$ | 2.46e−1 | 2.89e−1 | 2.22e−1 | 1.24e−1 | 9.70e−1 |

TABLE 22

| LIS unit (TYPE B) | Flow rate [mol/s] | Molar fraction | | |
|---|---|---|---|---|
| | | $O_2$ | $O_3$ | Kr |
| (1) LIS unit feed ($O_2$) | 4.63E−05 | 1.00 | — | — |
| (2) Inlet of ozonizer: $O_2$ processing capacity of ozonizer | 3.24E−04 | 1.00 | — | — |
| (3) Outlet of ozonizer | 3.08E−04 | 0.90 | 0.10 | — |
| (4) $O_3$ separation column feed | 5.86E−04 | 0.47 | 0.05 | 0.47 |
| (5) $O_3$ separation column top = Waste $O_2$ gas | 2.78E−04 | 1.00 | — | — |
| (6) $O_3$ separation column bottom = LIS first-stage feed ($O_3$, Kr) | 3.08E−04 | — | 0.10 | 0.90 |
| (7) LIS outlet = $O_2$ separation column feed ($O_2$, $O_3$, Kr) | 3.15E−04 | 0.06 | 0.06 | 0.88 |
| (8) $O_2$ separation column top = LIS concentration $O_2$-1 | 1.82E−05 | 1.00 | — | — |
| (9) $O_2$ separation column bottom = LIS second-stage feed ($O_3$, Kr) | 2.96E−04 | — | 0.06 | 0.94 |
| (10) LIS outlet = $O_2$ separation column feed ($O_2$, $O_3$, Kr) | 2.97E−04 | 0.00 | 0.06 | 0.94 |
| (11) $O_2$ separation column top = LIS concentration $O_2$-2 | 1.00E−06 | 1.00 | — | 0.94 |
| (12) $O_2$ separation column bottom = Ozone separation apparatus inlet ($O_3$, Kr) | 2.96E−04 | — | 0.06 | 0.91 |
| (13) Ozone separation apparatus outlet = Kr recovery inlet ($O_2$, Kr) | 3.05E−04 | 0.09 | — | 1.00 |
| (14) Kr recovery outlet (Kr): Circulating quantity of Kr | 2.78E−04 | — | — | — |
| (15) Kr recovery outlet ($O_2$): LIS depletion $O_2$ | 2.70E−05 | 1.00 | — | — |

| | |
|---|---|
| Ozonizer unit requirement (g$O_3$/kWh) | 220 |
| Ozonizer $O_3$ generating capacity (kg$O_3$/h) | 5.33E−03 |
| Ozonizer power consumption (kW) | 2.42E−02 |
| Target for laser separation (first-stage) | $^{16}O^{16}O^{18}O$ |
| Decomposition ratio of the target | 90% |
| Laser output power (W) | 0.733 |
| Target for laser separation (second-stage) | $^{16}O^{16}O^{17}O$ |
| Decomposition ratio of the target | 90% |
| Laser output power (W) | 0.040 |

Eighth Embodiment

Figure 18:
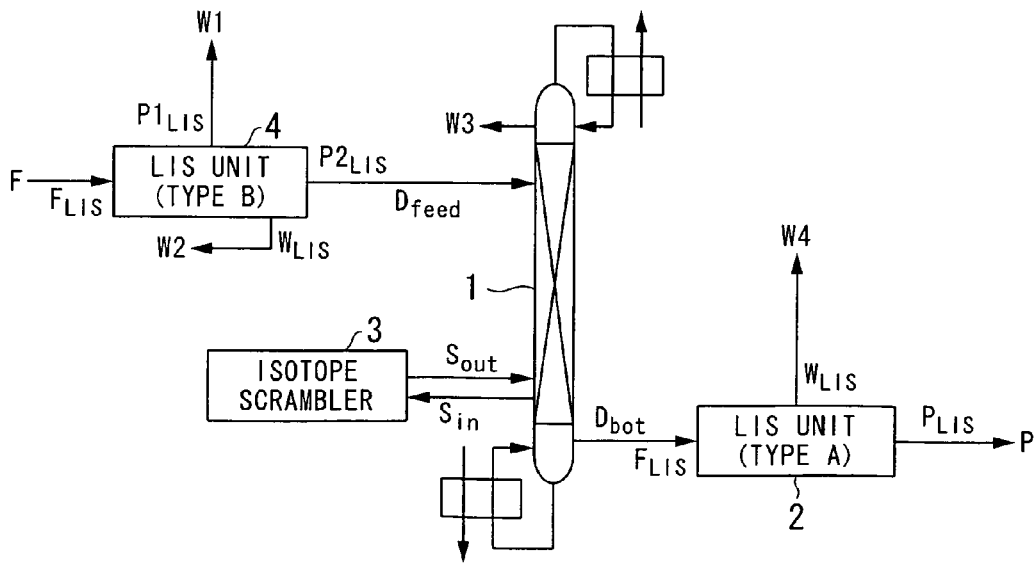
FIG. 18 is a schematic diagram showing an eighth embodiment of the present invention.

In this embodiment, oxygen enriched in $^{17}O$ to a concentration higher than the natural abundance is used as the starting material so as to concentrate $^{17}O$ to an ultra-high concentration (for example, 40 atom % or higher) by means of a laser separation apparatus and a distillation column. The constitution of this embodiment is schematically shown in FIG. 18.

As mentioned previously, distillation tends to cause $^{18}O$, which has the highest boiling point among the oxygen isotopes and is most abundant in nature, to be concentrated at the bottom of the distillation column. Therefore, in order to concentrate $^{17}O$ efficiently to an ultra-high concentration, for example, it is preferable to remove $^{18}O$ from the distillation column as far as possible. Accordingly in this embodiment, $^{18}O$-enriched oxygen W1 is separated from the oxygen included in the starting material F by using the laser separation apparatus 4 in the first stage, and a $^{17}O$-enriched oxygen $D_{feed}$ is sent to the distillation column 1 in the second stage. This enables suppression of the concentration of $^{18}O$ within the distillation column 1.

In the case of distillation, when the concentration of $^{17}O$ approaches the ultra-high concentration (for example, 40 atom % or higher), the ratio of change in $^{17}O$ concentration within the distillation column to the change in the height of the distillation column decreases, and it becomes difficult to concentrate $^{17}O$ further. Accordingly in this embodiment, oxygen gas $D_{bot}$ is fed to the laser separation apparatus 2 when the concentration of $^{17}O$ at the bottom of the distillation column 1 exceeds 40 atom %, so as to selectively decompose $^{17}O_3$ and obtain $^{17}O$-enriched oxygen P.

In this operation, a high concentration of $^{17}O$ can be achieved very efficiently.

Figure 19:
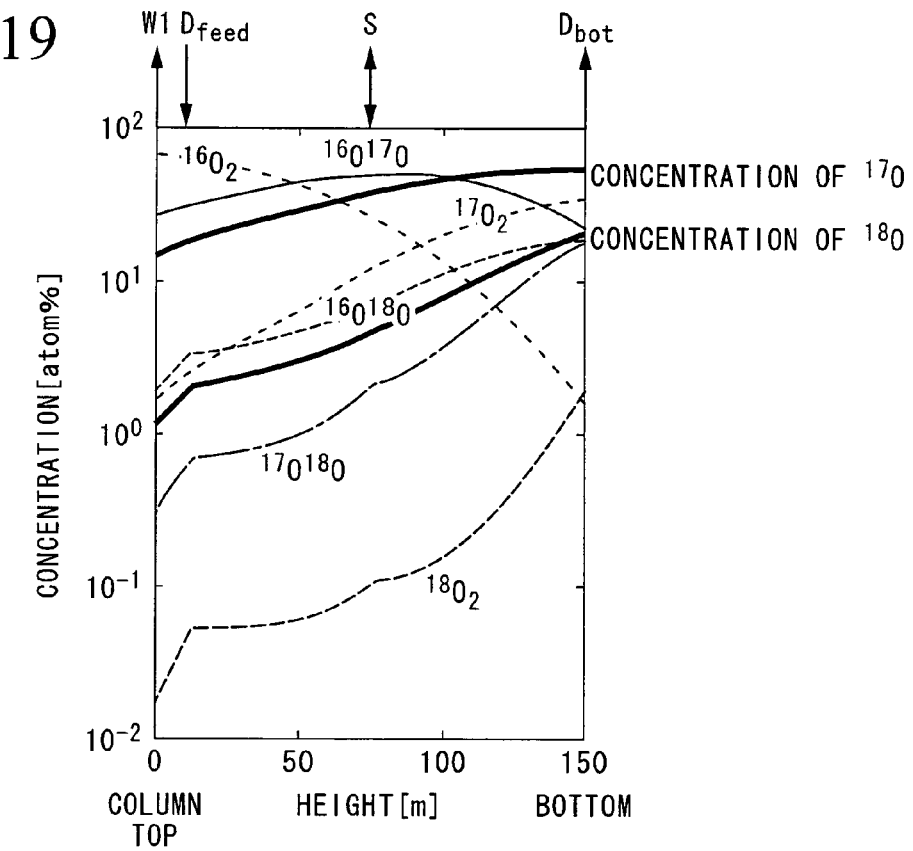
FIG. 19 is a graph showing the composition distribution of oxygen isotopes within a distillation column according to the eighth embodiment of the present invention.

The operation was simulated on a computer by assuming the distillation column 1 as having the specifications shown in Table 3, the laser separation apparatus 4 as having the constitution shown in FIG. 7 and the specifications shown in Table 25, the laser separation apparatus 2 as having the specifications shown in Table 26, and the ultra-high purity oxygen F of the starting material as having the composition shown in Table 2. Flow rates of oxygen and the composition of isotopes in various points of the apparatus determined by the simulation are shown in Tables 23 and 24. It can be seen that P is enriched in $^{17}O$ and W1 is enriched in $^{18}O$. The composition distribution of oxygen isotopes within the distillation column 1 is shown in FIG. 19.

TABLE 23

|  |  | F | W1 | W2 | $D_{feed}$ | W3 |
|---|---|---|---|---|---|---|
| Flow rate [mol/s] |  | 1.00e−3 | 2.28e−4 | 5.68e−4 | 2.05e−4 | 1.71e−4 |
| Composition [mol %] | $^{16}O_2$ | 5.88e−1 | 5.15e−1 | 6.37e−1 | 5.39e−1 | 6.91e−1 |
|  | $^{16}O^{17}O$ | 1.76e−1 | 8.65e−2 | 1.56e−1 | 3.25e−1 | 2.68e−1 |
|  | $^{16}O^{18}O$ | 1.82e−1 | 3.19e−1 | 1.66e−1 | 6.59e−2 | 2.02e−2 |
|  | $^{17}O_2$ | 1.31e−2 | 3.63e−3 | 9.59e−3 | 4.89e−2 | 1.73e−2 |
|  | $^{17}O^{18}O$ | 2.72e−2 | 2.67e−2 | 2.03e−2 | 1.99e−2 | 2.92e−3 |
|  | $^{18}O_2$ | 1.41e−2 | 4.93e−2 | 1.08e−2 | 2.01e−3 | 1.58e−4 |
| Purity of isotope [atom %] | $^{16}O$ | 7.67e−1 | 7.18e−1 | 7.98e−1 | 7.34e−1 | 8.35e−1 |
|  | $^{17}O$ | 1.15e−1 | 6.02e−2 | 9.79e−2 | 2.21e−1 | 1.53e−3 |
|  | $^{18}O$ | 1.19e−1 | 2.22e−1 | 1.04e−1 | 4.49e−2 | 1.17e−1 |

TABLE 24

|  |  | $S_{in}$ | $S_{out}$ | $D_{bot}$ | W4 | P |
|---|---|---|---|---|---|---|
| Flow rate [mol/s] |  | 2.05e−4 | 2.05e−4 | 3.39e−5 | 2.45e−5 | 9.44e−6 |
| Composition [mol %] | $^{16}O_2$ | 2.75e−1 | 3.16e−1 | 1.63e−2 | 7.06e−2 | 1.30e−2 |
|  | $^{16}O^{17}O$ | 5.04e−1 | 4.40e−1 | 2.24e−1 | 2.56e−1 | 1.77e−1 |
|  | $^{16}O^{18}O$ | 6.96e−2 | 5.21e−2 | 1.91e−1 | 1.34e−1 | 2.48e−2 |
|  | $^{17}O_2$ | 1.29e−1 | 1.54e−1 | 3.54e−1 | 2.33e−1 | 6.04e−1 |
|  | $^{17}O^{18}O$ | 2.11e−2 | 3.63e−2 | 1.97e−1 | 2.43e−1 | 1.69e−1 |
|  | $^{18}O_2$ | 1.04e−3 | 2.15e−3 | 1.81e−2 | 6.33e−2 | 1.19e−2 |

TABLE 24-continued

|  |  | $S_{in}$ | $S_{out}$ | $D_{bot}$ | W4 | P |
|---|---|---|---|---|---|---|
| Purity of isotope [atom %] | $^{16}O$ | 5.62e−1 | 5.62e−1 | 2.23e−1 | 2.66e−1 | 1.14e−1 |
|  | $^{17}O$ | 3.92e−1 | 3.92e−1 | 5.65e−3 | 4.83e−1 | 7.77e−1 |
|  | $^{18}O$ | 4.63e−2 | 4.63e−2 | 2.12e−1 | 2.52e−1 | 1.09e−1 |

TABLE 25

| LIS unit (TYPE B) | Flow rate [mol/s] | Molar fraction $O_2$ | $O_3$ | Kr |
|---|---|---|---|---|
| (1) LIS unit feed ($O_2$) | 1.00E−03 | 1.00 | — | — |
| (2) Inlet of ozonizer: $O_2$ processing capacity of ozonizer | 7.01E−03 | 1.00 | — | — |
| (3) Outlet of ozonizer | 6.67E−03 | 0.90 | 0.10 | — |
| (4) $O_3$ separation column feed | 1.27E−04 | 0.47 | 0.05 | 0.47 |
| (5) $O_3$ separation column top = Waste $O_2$ gas | 6.01E−03 | 1.00 | — | — |
| (6) $O_3$ separation column bottom = LIS first-stage feed ($O_3$, Kr) | 6.67E−03 | — | 0.10 | 0.90 |
| (7) LIS outlet = $O_2$ separation column feed ($O_2$, $O_3$, Kr) | 6.75E−03 | 0.03 | 0.08 | 0.89 |
| (8) $O_2$ separation column top = LIS concentration $O_2$-1 | 2.28E−04 | 1.00 | — | — |
| (9) $O_2$ separation column bottom = LIS second-stage feed ($O_3$, Kr) | 6.52E−03 | — | 0.08 | 0.92 |
| (10) LIS outlet = $O_2$ separation column feed ($O_2$, $O_3$, Kr) | 6.59E−03 | 0.03 | 0.06 | 0.91 |
| (11) $O_2$ separation column top = LIS concentration $O_2$-2 | 2.05E−04 | 1.00 | — | — |
| (12) $O_2$ separation column bottom = Ozone separation apparatus inlet ($O_3$, Kr) | 6.38E−03 | — | 0.06 | 0.94 |
| (13) Ozone separation apparatus outlet = Kr recovery inlet ($O_2$, Kr) | 6.57E−03 | 0.09 | — | 0.91 |
| (14) Kr recovery outlet (Kr): Circulating quantity of Kr | 6.01E−03 | — | — | 1.00 |
| (15) Kr recovery outlet ($O_2$): LIS depletion $O_2$ | 5.68E−04 | 1.00 | — | — |

| Ozonizer unit requirement (g$O_3$/kWh) | 220 |
|---|---|
| Ozonizer $O_3$ generating capacity (kg$O_3$/h) | 1.15E−01 |
| Ozonizer power consumption (kW) | 5.24E−01 |
| Target for laser separation (first-stage) | $^{16}O^{16}O^{18}O$ |
| Decomposition ratio of the target | 90% |
| Laser output power (W) | 9.15 |
| Target for laser separation (second-stage) | $^{16}O^{16}O^{17}O$ |
| Decomposition ratio of the target | 90% |
| Laser output power (W) | 8.22 |

TABLE 26

| LIS unit (TYPE A) | Flow rate [mol/s] | Molar fraction $O_2$ | $O_3$ | Kr |
|---|---|---|---|---|
| (1) LIS unit feed ($O_2$) | 3.39E−05 | 1.00 | — | — |
| (2) Inlet of ozonizer: $O_2$ processing capacity of ozonizer | 2.38E−04 | 1.00 | — | — |
| (3) Outlet of ozonizer | 2.26E−04 | 0.90 | 0.10 | — |
| (4) $O_3$ separation column feed | 4.30E−04 | 0.47 | 0.05 | 0.47 |
| (5) $O_3$ separation column top = Waste $O_2$ gas | 2.04E−04 | 1.00 | — | — |
| (6) $O_3$ separation column bottom = LIS first ($O_3$, Kr) | 2.26E−04 | — | 0.10 | 0.90 |
| (7) LIS outlet = $O_2$ separation column feed ($O_2$, $O_3$, Kr) | 2.29E−04 | 0.04 | 0.07 | 0.89 |
| (8) $O_2$ separation column top = LIS concentration $O_2$ | 9.44E−06 | 1.00 | — | — |
| (9) $O_2$ separation column bottom = Ozone separation apparatus inlet ($O_3$, Kr) | 2.20E−04 | — | 0.07 | 0.93 |

TABLE 26-continued

| | | | | |
|---|---|---|---|---|
| (10) Ozone separation apparatus outlet = Kr recovery inlet ($O_2$, Kr) | 2.28E−04 | 0.11 | — | 0.89 |
| (11) Kr recovery outlet (Kr): Circulating quantity of Kr | 2.04E−04 | — | — | 1.00 |
| (12) Kr recovery outlet ($O_2$): LIS depletion $O_2$ | 2.45E−05 | 1.00 | — | — |

| | |
|---|---|
| Ozonizer unit requirement (g$O_3$/kWh) | 220 |
| Ozonizer $O_3$ generating capacity (kg$O_3$/h) | 3.91E−03 |
| Ozonizer power consumption (kW) | 1.78E−02 |
| Target for laser separation (first-stage) | $^{17}O^{17}O^{17}O$ |
| Decomposition ratio of the target | 90% |
| Laser output power (W) | 0.380 |

Ninth Embodiment

Figure 20:
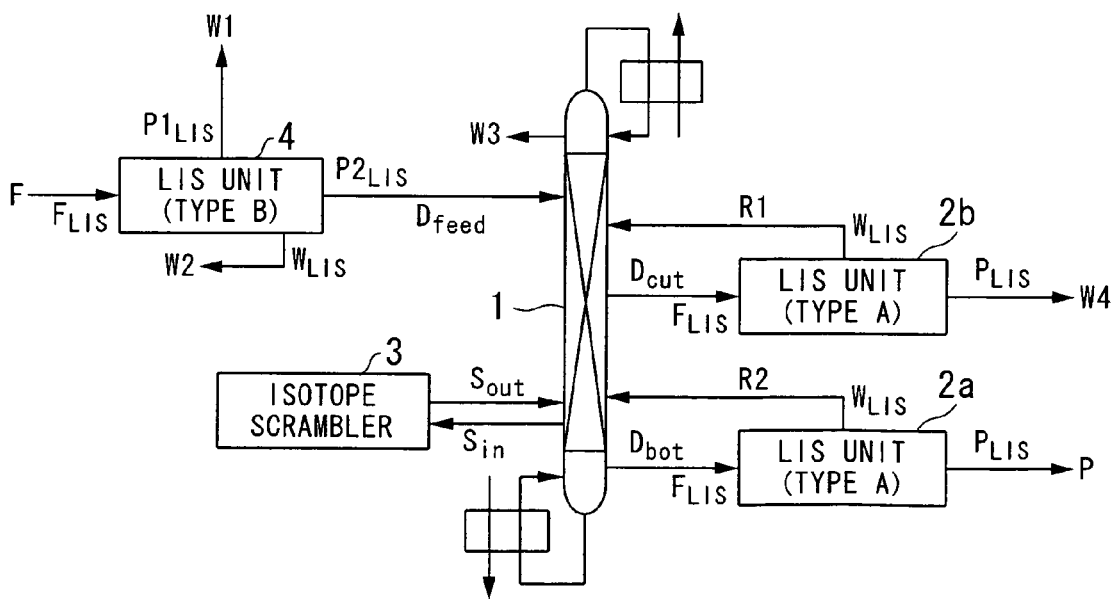
FIG. 20 is a schematic diagram showing a ninth embodiment of the present invention.

This embodiment is an advancement of the eighth embodiment as shown in FIG. 20, aimed at further improvements in the concentration and yield of $^{17}O$. Differences from the eighth embodiment are that, when $^{17}O$-enriched oxygen P is obtained by using the laser separation apparatus 2a connected to the distillation column 1 at the bottom thereof, the waste gas R2 from the laser separation apparatus 2a is returned to the distillation column 1 and $^{18}O$-enriched oxygen W4 is selectively separated by using the laser separation apparatus 2b connected to the distillation column 1 at an intermediate point thereof.

This enables suppression of the concentration of $^{18}O$ at the bottom of the distillation column 1, so that $^{17}O$ of a further higher concentration is obtained.

Figure 21:
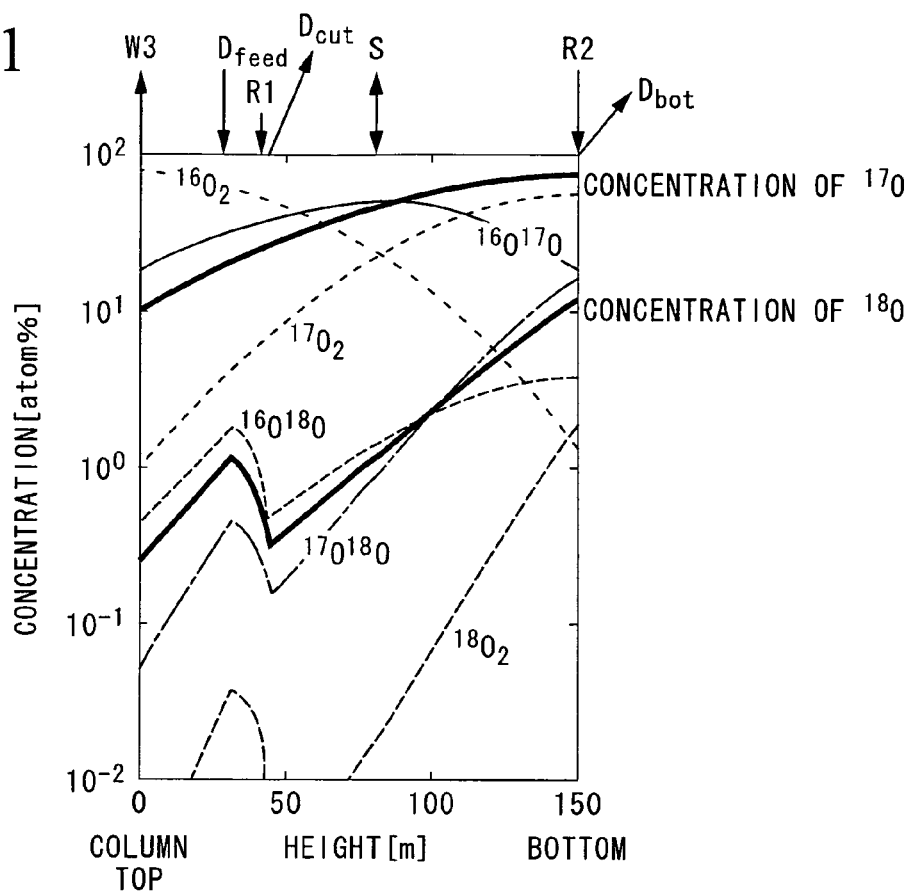
FIG. 21 is a graph showing the composition distribution of oxygen isotopes within a distillation column according to the ninth embodiment of the present invention.
Figure 22:
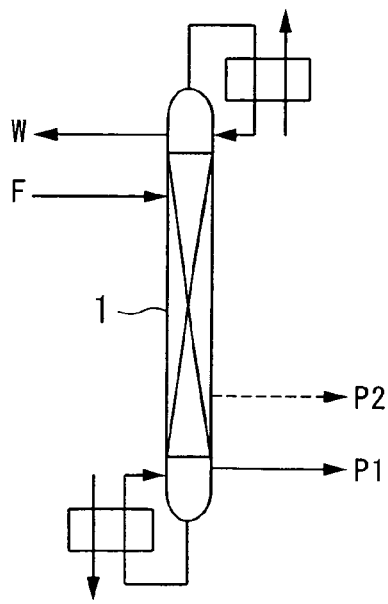
FIG. 22 is a schematic diagram showing an example of a distillation column used in the prior art method of concentrating an oxygen isotope.
Figure 23:
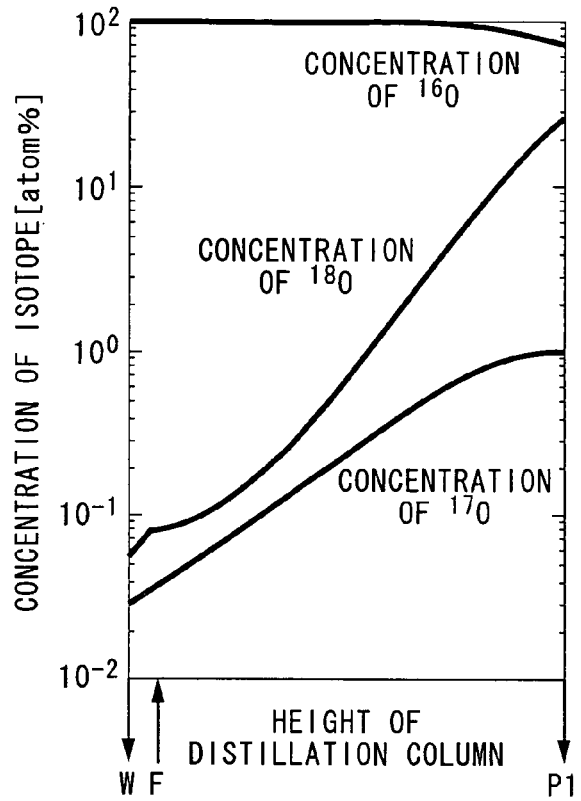
FIG. 23 is a graph showing an example of the composition distribution of oxygen isotopes within a distillation column.
Figure 24:
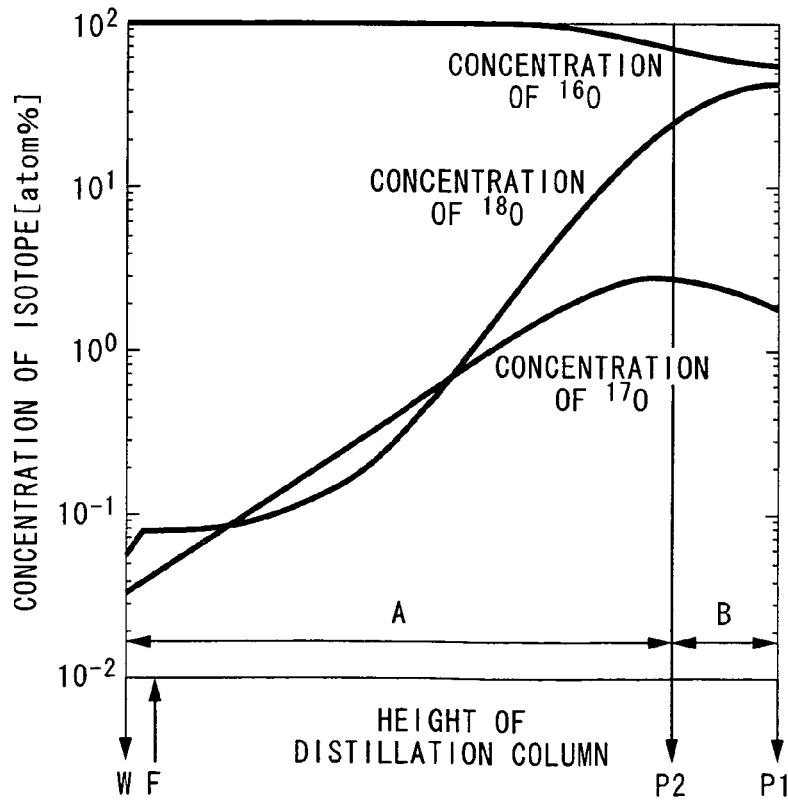
FIG. 24 is a graph showing an example of the composition distribution of oxygen isotopes within a distillation column having a large theoretical number of plates.

The operation was simulated on a computer by assuming the distillation column 1 as having the specifications shown in Table 3, the laser separation apparatus 4 as having the specifications shown in Table 25, the laser separation apparatus 2b as having the specifications shown in Table 30, the laser separation apparatus 2a as having the specifications shown in Table 31 and the ultra-high purity oxygen F of the starting material as having the composition shown in Table 2. Flow rates of oxygen and the composition of isotopes in various points of the apparatus determined by the simulation are shown in Tables 27 to 29. It can be seen that P is enriched in $^{17}O$ and W1 is enriched in $^{18}O$. The composition distribution of oxygen isotopes within the distillation column 1 is shown in FIG. 21.

TABLE 27

| | | F | W1 | W2 | $D_{feed}$ | W3 |
|---|---|---|---|---|---|---|
| Flow rate [mol/s] | | 1.00e−3 | 2.28e−4 | 5.68e−4 | 2.05e−4 | 5.39e−5 |
| Composition [mol %] | $^{16}O_2$ | 5.88e−1 | 5.15e−1 | 6.37e−1 | 5.39e−1 | 8.00e−1 |
| | $^{16}O^{17}O$ | 1.76e−1 | 8.65e−2 | 1.56e−1 | 3.25e−1 | 1.85e−1 |
| | $^{16}O^{18}O$ | 1.82e−1 | 3.19e−1 | 1.66e−2 | 6.59e−2 | 4.43e−3 |
| | $^{17}O_2$ | 1.31e−2 | 3.63e−3 | 9.59e−3 | 4.89e−2 | 9.96e−3 |
| | $^{17}O^{18}O$ | 2.72e−2 | 2.67e−2 | 2.03e−2 | 1.99e−2 | 4.74e−4 |
| | $^{18}O_2$ | 1.41e−2 | 4.93e−2 | 1.08e−2 | 2.01e−3 | 1.60e−5 |
| Purity of isotope [atom %] | $^{16}O$ | 7.67e−1 | 7.18e−1 | 7.98e−1 | 7.34e−1 | 8.95e−1 |
| | $^{17}O$ | 1.15e−1 | 6.02e−2 | 9.79e−2 | 2.21e−1 | 1.03e−1 |
| | $^{18}O$ | 1.19e−1 | 2.22e−1 | 1.04e−1 | 4.49e−2 | 2.46e−3 |

TABLE 28

| | | $D_{cut}$ | R1 | W4 | $S_{in}$ |
|---|---|---|---|---|---|
| Flow rate [mol/s] | | 8.21e−3 | 8.07e−3 | 1.44e−4 | 2.05e−4 |
| Composition [mol %] | $^{16}O_2$ | 5.40e−1 | 5.41e−1 | 4.98e−1 | 2.52e−1 |
| | $^{16}O^{17}O$ | 3.85e−1 | 3.86e−1 | 3.31e−1 | 5.00e−1 |
| | $^{16}O^{18}O$ | 4.65e−3 | 3.14e−3 | 8.47e−2 | 1.40e−2 |
| | $^{17}O_2$ | 6.81e−2 | 6.87e−2 | 5.49e−2 | 2.24e−1 |
| | $^{17}O^{18}O$ | 1.55e−3 | 1.12e−3 | 2.81e−2 | 9.72e−3 |
| | $^{18}O_2$ | 5.06e−5 | 4.56e−6 | 3.60e−3 | 1.67e−4 |
| Purity of isotope [atom %] | $^{16}O$ | 7.35e−1 | 7.36e−1 | 7.06e−1 | 5.09e−1 |
| | $^{17}O$ | 2.62e−1 | 2.62e−1 | 2.34e−1 | 4.79e−1 |
| | $^{18}O$ | 3.15e−3 | 2.14e−3 | 6.00e−2 | 1.20e−2 |

TABLE 29

| | | $S_{out}$ | $D_{bot}$ | R2 | P |
|---|---|---|---|---|---|
| Flow rate [mol/s] | | 2.05e−4 | 1.28e−5 | 5.96e−6 | 6.87e−6 |
| Composition [mol %] | $^{16}O_2$ | 2.59e−1 | 1.42e−2 | 4.15e−2 | 4.25e−3 |
| | $^{16}O^{17}O$ | 4.88e−1 | 1.91e−1 | 2.47e−1 | 1.14e−1 |
| | $^{16}O^{18}O$ | 1.22e−2 | 3.96e−2 | 7.71e−2 | 7.92e−3 |
| | $^{17}O_2$ | 2.29e−1 | 5.73e−1 | 3.69e−1 | 7.64e−1 |
| | $^{17}O^{18}O$ | 1.15e−2 | 1.64e−1 | 2.30e−1 | 1.06e−1 |
| | $^{18}O_2$ | 1.44e−4 | 1.88e−2 | 3.58e−2 | 3.69e−3 |
| Purity of isotope [atom %] | $^{16}O$ | 5.09e−1 | 1.30e−1 | 2.04e−1 | 6.52e−2 |
| | $^{17}O$ | 4.79e−1 | 7.50e−1 | 6.07e−1 | 8.74e−1 |
| | $^{18}O$ | 1.20e−2 | 1.20e−1 | 1.89e−1 | 6.08e−2 |

TABLE 30

| | Flow rate | Molar fraction | | |
|---|---|---|---|---|
| LIS unit (TYPE A) | [mol/s] | $O_2$ | $O_3$ | Kr |
| (1) LIS unit feed ($O_2$) | 8.21E−03 | 1.00 | — | — |
| (2) Inlet of ozonizer: $O_2$ processing capacity of ozonizer | 5.75E−02 | 1.00 | — | — |
| (3) Outlet of ozonizer | 5.48E−02 | 0.90 | 0.10 | — |
| (4) $O_3$ separation column feed | 1.04E−01 | 0.47 | 0.05 | 0.47 |
| (5) $O_3$ separation column top = Waste $O_2$ gas | 4.93E−02 | 1.00 | — | — |
| (6) $O_3$ separation column bottom = LIS feed ($O_3$, Kr) | 5.48E−02 | — | 0.10 | 0.90 |
| (7) LIS outlet = $O_2$ separation column feed ($O_2$, $O_3$, Kr) | 5.48E−02 | 0.00 | 0.10 | 0.90 |
| (8) $O_2$ separation column top = LIS concentration $O_2$ | 1.44E−04 | 1.00 | — | — |
| (9) $O_2$ separation column bottom = Ozone separation apparatus inlet ($O_3$, Kr) | 5.47E−02 | — | 0.10 | 0.90 |
| (10) Ozone separation apparatus outlet = Kr recovery inlet ($O_2$, Kr) | 5.74E−02 | 0.14 | — | 0.86 |
| (11) Kr recovery outlet (Kr): Circulating quantity of Kr | 4.93E−02 | — | — | 1.00 |
| (12) Kr recovery outlet ($O_2$): LIS depletion $O_2$ | 8.07E−03 | 1.00 | — | — |

| | |
|---|---|
| Ozonizer unit requirement (g$O_3$/kWh) | 220 |
| Ozonizer $O_3$ generating capacity (kg$O_3$/h) | 9.46E−01 |
| Ozonizer power consumption (kW) | 4.30E+00 |
| Target for laser separation (first-stage) | $^{16}O^{16}O^{18}O$ |
| Decomposition ratio of the target | 90% |
| Laser output power (W) | 5.79 |

TABLE 31

| | Flow rate | Molar fraction | | |
|---|---|---|---|---|
| LIS unit (TYPE A) | [mol/s] | $O_2$ | $O_3$ | Kr |
| (1) LIS unit feed ($O_2$) | 1.28E−05 | 1.00 | — | — |
| (2) Inlet of ozonizer: $O_2$ processing capacity of ozonizer | 8.98E−05 | 1.00 | — | — |
| (3) Outlet of ozonizer | 8.55E−05 | 0.90 | 0.10 | — |
| (4) $O_3$ separation column feed | 1.63E−04 | 0.47 | 0.05 | 0.47 |
| (5) $O_3$ separation column top = Waste $O_2$ gas | 7.70E−05 | 1.00 | — | — |

TABLE 31-continued

| | | | | |
|---|---|---|---|---|
| (6) $O_3$ separation column bottom = LIS feed ($O_3$, Kr) | 8.55E−05 | — | 0.10 | 0.90 |
| (7) LIS outlet = $O_2$ separation column feed ($O_2$, $O_3$, Kr) | 8.78E−05 | 0.08 | 0.05 | 0.88 |
| (8) $O_2$ separation column top = LIS concentration $O_2$ | 6.87E−06 | 1.00 | — | — |
| (9) $O_2$ separation column bottom = Ozone separation apparatus inlet ($O_3$, Kr) | 8.10E−05 | — | 0.05 | 0.95 |
| (10) Ozone separation apparatus outlet = Kr recovery inlet ($O_2$, Kr) | 8.29E−05 | 0.07 | — | 0.93 |
| (11) Kr recovery outlet (Kr): Circulating quantity of Kr | 7.70E−05 | — | — | 1.00 |
| (12) Kr recovery outlet ($O_2$): LIS depletion $O_2$ | 5.96E−06 | 1.00 | — | — |

| | |
|---|---|
| Ozonizer unit requirement (g$O_3$/kWh) | 220 |
| Ozonizer $O_3$ generating capacity (kg$O_3$/h) | 1.48E−03 |
| Ozonizer power consumption (kW) | 6.72E−03 |
| Target for laser separation (first-stage) | $^{17}O^{17}O^{17}O$ |
| Decomposition ratio of the target | 90% |
| Laser output power (W) | 0.275 |

EXAMPLES

Example 1

The operation of concentrating $^{17}O$ and $^{18}O$ was simulated under the conditions of the first embodiment, and it was found that oxygen gas including 9.1 atom % of $^{17}O$ and oxygen gas including 25.2 atom % of $^{18}O$ could be obtained with a yield of 5.8% for $^{17}O$ and 69.8% for $^{18}O$.

Yield of $^{17}O$, for example, in Example 1 was determined by the following equation using the values given in Table 5.

Yield [%]=((Flow rate)$_P$×(Purity of isotope)$^{17}O_P$)/((Flow rate)$_F$×(Purity of isotope)$^{17}O_F$)×100

The yield of $^{18}O$ was also determined by a similar equation.

Example 2

The operation of concentrating $^{17}O$ and $^{18}O$ was simulated under the conditions of the second embodiment, and it was found that oxygen gas including 10.3 atom % of $^{17}O$ and oxygen gas including 25.2 atom % of $^{18}O$ could be obtained with a yield of 7.8% for $^{17}O$ and 73.1% for $^{18}O$, both higher than those of Example 1.

Example 3

The operation of concentrating $^{17}O$ and $^{18}O$ was simulated under the conditions of the third embodiment, and it was found that oxygen gas including 9.7 atom % of $^{17}O$ could be obtained, with a yield of 14.1% for $^{17}O$, higher than that of Example 1. While the yield of $^{18}O$ was 69.8%, comparable to that of Example 1, purity of isotope $^{18}O$ was 29.2 atom %, indicating that oxygen gas including $^{18}O$ of higher purity than that of Example 1 can be obtained.

Example 4

The operation of concentrating $^{17}O$ and $^{18}O$ was simulated under the conditions of the fourth embodiment, and it was found that oxygen gas including 10.8 atom % of $^{17}O$ and oxygen gas including 29.0 atom % of $^{18}O$ could be obtained. The yield of $^{17}O$ was 11.8%, higher than that of Example 1. The yield of $^{18}O$ was 70.9%.

Example 5

The operation of concentrating $^{17}O$ and $^{18}O$ was simulated under the conditions of the fifth embodiment, and it was found that oxygen gas including 11.5 atom % of $^{17}O$ and oxygen gas including 28.9 atom % of $^{18}O$ could be obtained with a yield of 14.0% for 17O and 72.8% for $^{18}O$.

Example 6

The operation of concentrating $^{17}O$ and $^{18}O$ was simulated under the conditions of the eighth embodiment, and it was found that oxygen gas including 77.7 atom % of $^{17}O$ and oxygen gas including 22.2 atom % of $^{18}O$ could be obtained.

Example 7

The operation of concentrating $^{17}O$ and $^{18}O$ was simulated under the conditions of the ninth embodiment, and it was found that oxygen gas including 87.4 atom % of $^{17}O$ and oxygen gas including 22.2 atom % of $^{18}O$ could be obtained.

It was verified that the method of the present invention is capable of efficiently concentrating stable oxygen isotopes $^{17}O$ and $^{18}O$ that have extremely low abundance to high concentrations. Also it was verified that, because this method can carry out concentration with a shorter startup time than in the prior art, $^{17}O$ and $^{18}O$ of high concentration can be obtained on an industrial scale at a low cost.

Moreover, heavy oxygen water enriched in $^{17}O$ or $^{18}O$ can be obtained at a low cost on an industrial scale, by using $^{17}O$-enriched oxygen or $^{18}O$-enriched oxygen obtained by the method for concentrating an oxygen isotope or isotopes of the present invention.

INDUSTRIAL APPLICABILITY

The present invention, that is capable of providing $^{17}O$-enriched or $^{18}O$-enriched oxygen at a low cost on an industrial scale, is valuable in chemical and medical fields where compounds labeled with $^{17}O$ or $^{18}O$ are used as a tracer.

The invention claimed is:

1. A method for concentrating an oxygen isotope or isotopes, comprising:

an oxygen distillation step in which a starting material oxygen comprising $^{16}O^{16}O$, $^{16}O^{17}O$, $^{16}O^{18}O$, $^{17}O^{17}O$, $^{17}O^{18}O$ and $^{18}O^{18}O$ distilled using a distillation column to generate a $^{17}O$-enriched oxygen in which at least one of $^{17}O$-oxygen components selected from the group consisting of $^{16}O^{17}O$, $^{17}O^{17}O$ and $^{17}O^{18}O$ is enriched an ozone generation step in which the $^{17}O$-enriched oxygen is used to generate an ozone;

a $^{17}O$-selective ozone photodissociation step in which a $^{17}O$-containing ozone within the ozone is selectively decomposed to generate the $^{17}O$-enriched oxygen in which at least one of the $^{17}O$-oxygen components selected from the group consisting of $^{16}O^{17}O$, $^{17}O^{17}O$ and $^{17}O^{18}O$ is enriched;

a $^{18}O$-selective ozone photodissociation step in which a $^{18}O$-containing ozone within the ozone is selectively decomposed to generate a $^{18}O$-enriched oxygen in which at least one of $^{18}O$-oxygen components selected from the group consisting of $^{16}O^{18}O$, $^{17}O^{18}O$ and $^{18}O^{18}O$ is enriched; and an oxygen returning step in which a part of oxygen, to be obtained by decomposing the remained ozone after the $^{17}$O-selective ozone photodissociation step and the $^{18}$O-selective ozone photodissociation step, is returned to the distillation column which is used in the oxygen distillation step.

2. The method for concentrating an oxygen isotope or isotopes according to claim 1, further comprising carrying out isotope scrambling.

3. The method for concentrating an oxygen isotope or isotopes according to claim 1, wherein at least one step of the $^{17}$O-selective ozone photodissociation step and the $^{18}$O-selective ozone photodissociation step is carried out twice or more.

4. The method for concentrating an oxygen isotope or isotopes according to claim 1, further comprising:
adding hydrogen to $^{17}$O-enriched oxygen or $^{18}$O-enriched oxygen to manufacture heavy oxygen water in which the oxygen isotope $^{17}$O or oxygen isotope $^{18}$O are concentrated to a 1 atom % or higher concentration.

5. The method for concentrating an oxygen isotope or isotopes according to claim 2, further comprising:
adding hydrogen to $^{17}$O-enriched oxygen or $^{18}$O-enriched oxygen to manufacture heavy oxygen water in which the oxygen isotope $^{17}$O or oxygen isotope $^{18}$O are concentrated to a 1 atom % or higher concentration.

6. The method for concentrating an oxygen isotope or isotopes according to claim 3, further comprising:
adding hydrogen to $^{17}$O-enriched oxygen or $^{18}$O-enriched oxygen to manufacture heavy oxygen water in which the oxygen isotope $^{17}$O or oxygen isotope $^{18}$O are concentrated to a 1 atom % or higher concentration.

7. The method for concentrating an oxygen isotope or isotopes according to claim 1, further comprising:
adding hydrogen to $^{17}$O-enriched oxygen and $^{18}$O-enriched oxygen to manufacture heavy oxygen water in which the oxygen isotope $^{17}$O and oxygen isotope $^{18}$O are concentrated to a 1 atom % or higher concentration.

8. The method for concentrating an oxygen isotope or isotopes according to claim 2, further comprising:
adding hydrogen to $^{17}$O-enriched oxygen and $^{18}$O-enriched oxygen to manufacture heavy oxygen water in which the oxygen isotope $^{17}$O and oxygen isotope $^{18}$O are concentrated to a 1 atom % or higher concentration.

9. The method for concentrating an oxygen isotope or isotopes according to claim 3, further comprising:
adding hydrogen to $^{17}$O-enriched oxygen and $^{18}$O-enriched oxygen to manufacture heavy oxygen water in which the oxygen isotope $^{17}$O and oxygen isotope $^{18}$O are concentrated to a 1 atom % or higher concentration.

* * * * *